(12) United States Patent
Kawakami et al.

(10) Patent No.: US 10,887,565 B2
(45) Date of Patent: Jan. 5, 2021

(54) INFORMATION PROCESSING DEVICE AND INFORMATION PROCESSING METHOD

(71) Applicant: SONY CORPORATION, Tokyo (JP)

(72) Inventors: Hiro Kawakami, Tokyo (JP); Hitoshi Sakaguchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 85 days.

(21) Appl. No.: 15/307,585

(22) PCT Filed: Jan. 20, 2015

(86) PCT No.: PCT/JP2015/051339
§ 371 (c)(1),
(2) Date: Oct. 28, 2016

(87) PCT Pub. No.: WO2015/170483
PCT Pub. Date: Nov. 12, 2015

(65) Prior Publication Data
US 2017/0054959 A1      Feb. 23, 2017

(30) Foreign Application Priority Data

May 9, 2014   (JP) .................................. 2014-097575

(51) Int. Cl.
*H04N 9/31*        (2006.01)
*G03B 21/26*       (2006.01)
(Continued)

(52) U.S. Cl.
CPC ........... *H04N 9/3185* (2013.01); *G03B 21/14* (2013.01); *G03B 21/26* (2013.01); *G06F 3/048* (2013.01);
(Continued)

(58) Field of Classification Search
CPC ........ H04N 9/3185; H04N 5/74; G03B 21/14; G03B 21/26; G09G 3/002
See application file for complete search history.

(56) References Cited

U.S. PATENT DOCUMENTS

| 7,720,436 B2 * | 5/2010 | Hamynen | G06F 3/147 |
| | | | 455/13.1 |
| 8,373,725 B2 * | 2/2013 | Ryu | G06T 19/006 |
| | | | 345/633 |

(Continued)

FOREIGN PATENT DOCUMENTS

| JP | 2001-154768 A | 6/2001 |
| JP | 2003-302701 A | 10/2003 |

(Continued)

OTHER PUBLICATIONS

JP 2003-302701A (Machine Translation on Jan. 16, 2017).*

*Primary Examiner* — Michael Le
(74) *Attorney, Agent, or Firm* — Chip Law Group

(57) ABSTRACT

Display of an image projected on a projection plane is appropriately controlled. An information processing device is an information processing device including a control unit. Here, a projection unit projects and displays a part of an image to be displayed on a projection plane. In addition, the control unit included in the information processing device controls the image displayed on the projection plane on the basis of a display area of the image displayed on the projection plane specified on the basis of a relative positional relationship between a projection unit and the projection plane and control information associated with the image to be displayed.

12 Claims, 20 Drawing Sheets

(51) Int. Cl.
  *G09G 3/00* (2006.01)
  *G06F 3/048* (2013.01)
  *G03B 21/14* (2006.01)

(52) U.S. Cl.
  CPC ........... *G09G 3/002* (2013.01); *H04N 9/3173* (2013.01); *H04N 9/3179* (2013.01); *H04N 9/3194* (2013.01); *G09G 2340/0464* (2013.01); *G09G 2340/12* (2013.01)

(56) References Cited

U.S. PATENT DOCUMENTS

| | | | | |
|---|---|---|---|---|
| 2005/0046803 A1* | 3/2005 | Akutsu | ................ | H04N 5/74 353/69 |
| 2006/0033702 A1* | 2/2006 | Beardsley | ............ | G06F 3/0338 345/156 |
| 2006/0146015 A1* | 7/2006 | Buchmann | ......... | G02B 26/0816 345/156 |
| 2010/0188587 A1* | 7/2010 | Ashley | .................. | H04N 5/74 348/744 |
| 2011/0170021 A1* | 7/2011 | Ozawa | .................. | G03B 21/26 348/744 |
| 2012/0075348 A1* | 3/2012 | Kasahara | ............. | G06F 1/1694 345/671 |
| 2012/0105475 A1* | 5/2012 | Tseng | ..................... | G01S 19/13 345/633 |
| 2012/0165077 A1* | 6/2012 | Ueno | .................. | H04M 1/0272 455/566 |
| 2012/0176304 A1* | 7/2012 | Mizuno | ................. | G06F 3/0416 345/156 |
| 2012/0182531 A1* | 7/2012 | Ueno | ...................... | G03B 21/00 353/85 |
| 2014/0176599 A1* | 6/2014 | Watanabe | ........... | G06K 9/00228 345/619 |
| 2015/0379776 A1* | 12/2015 | Ito | ............................. | G09G 5/10 345/419 |

FOREIGN PATENT DOCUMENTS

| | | |
|---|---|---|
| JP | 2006-053909 A | 2/2006 |
| JP | 2011-085712 A | 4/2011 |
| JP | 2012-138686 A | 7/2012 |
| WO | 2008-120020 A2 | 10/2008 |

* cited by examiner

FIG. 3

SPATIAL POSITION ACTION MEMORY 141

| OPERATION MODE (201) | DATA TYPE (202) | SPATIAL POSITION INFORMATION TYPE (203) | SPATIAL POSITION INFORMATION (204) | ACTION DEFINITION (205) | ADDITIONAL INFORMATION (206) |
|---|---|---|---|---|---|
| PLANETARIUM | POSITION DATA OF STAR | EQUATORIAL COORDINATES | 2h32m, +89 | DISPLAY ADDITIONAL INFORMATION ON SPATIAL POSITION | POLAR STAR |
| | | EQUATORIAL COORDINATES | 4h36m, +16 | DISPLAY ADDITIONAL INFORMATION ON SPATIAL POSITION | ALDEBARAN |
| | | ... | ... | ... | ... |
| | CONSTELLATION DATA | EQUATORIAL COORDINATES | 1h00m, +62 | DISPLAY ADDITIONAL INFORMATION ON SPATIAL POSITION | CASSIOPEIA |
| | | EQUATORIAL COORDINATES | 5h30m, +3 | DISPLAY ADDITIONAL INFORMATION ON SPATIAL POSITION | ORION |
| | | ... | ... | ... | ... |
| | OMNIDIRECTIONAL IMAGE OF MILKY WAY | WHOLE SPHERE | — | DISPLAY IMAGE DATA | IMAGE DATA |
| SPATIAL POSITION QUIZ | SPATIAL POSITION DATA | LATITUDE/ LONGITUDE | N38, E23 | DISPLAY ADDITIONAL INFORMATION + "WHERE?" AT SCREEN CENTER | ATHENS (GREECE) |
| | | LATITUDE/ LONGITUDE | N34, E151 | DISPLAY ADDITIONAL INFORMATION + "WHERE?" AT SCREEN CENTER | SYDNEY (AUSTRALIA) |
| | | LATITUDE/ LONGITUDE | N1, E104 | DISPLAY ADDITIONAL INFORMATION + "WHERE?" AT SCREEN CENTER | SINGAPORE (SINGAPORE) |
| | | ... | ... | ... | ... |
| | BACKGROUND IMAGE | WHOLE SPHERE | — | DISPLAY IMAGE DATA | IMAGE DATA OF OMNIDIRECTIONAL WORLD MAP |
| | CORRECT ANSWER ACTION | NIL | | REPRODUCE ADDITIONAL INFORMATION | CORRECT ANSWER SOUND DATA |
| | INCORRECT ANSWER ACTION | NIL | | REPRODUCE ADDITIONAL INFORMATION | INCORRECT ANSWER SOUND DATA |
| SHOOTING | TARGET DATA | CYLINDRICAL COORDINATES | RANDOMLY GENERATED | DISPLAY ADDITIONAL INFORMATION ON SPATIAL POSITION | TARGET IMAGE 1 DATA |
| | | CYLINDRICAL COORDINATES | RANDOMLY GENERATED | DISPLAY ADDITIONAL INFORMATION ON SPATIAL POSITION | TARGET IMAGE 2 DATA |
| | | ... | ... | ... | ... |
| | HIT ACTION | NIL | | REPRODUCE ADDITIONAL INFORMATION | HIT SOUND DATA |
| DRAWING | DRAWING DATA | POLAR COORDINATES | 0, 0, 1 | DRAW LINE WITH ADDITIONAL INFORMATION ON SPATIAL POSITION | COLOR, WIDTH INFORMATION |
| | | POLAR COORDINATES | 10, 10, 1 | DRAW LINE WITH ADDITIONAL INFORMATION ON SPATIAL POSITION | COLOR, WIDTH INFORMATION |
| | | ... | ... | ... | ... |

FIG. 10
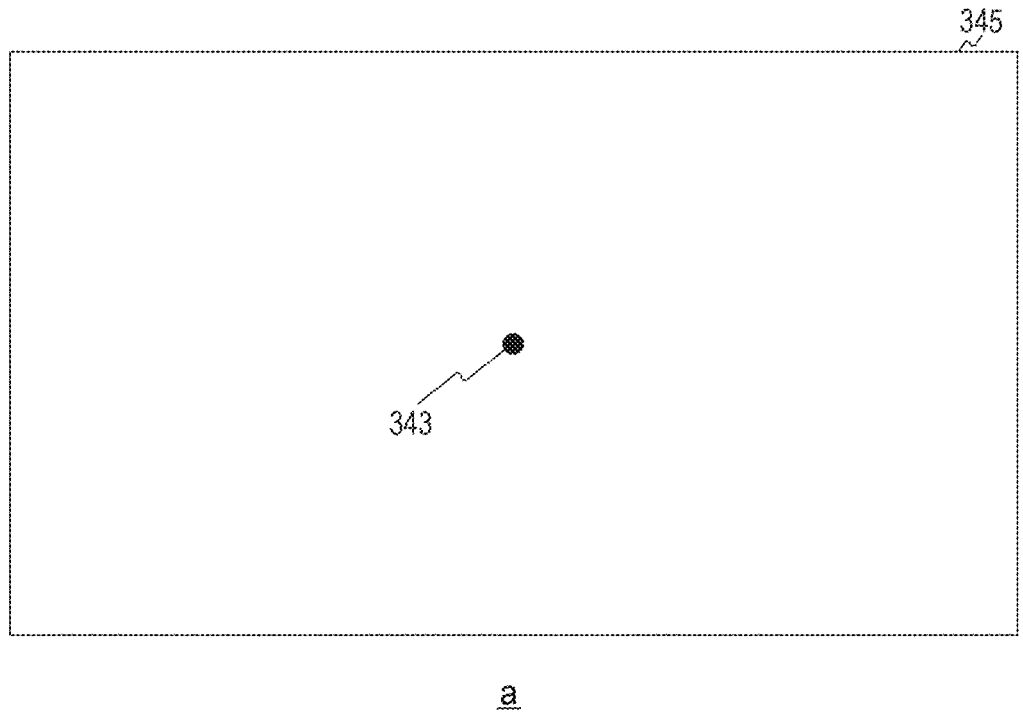
a
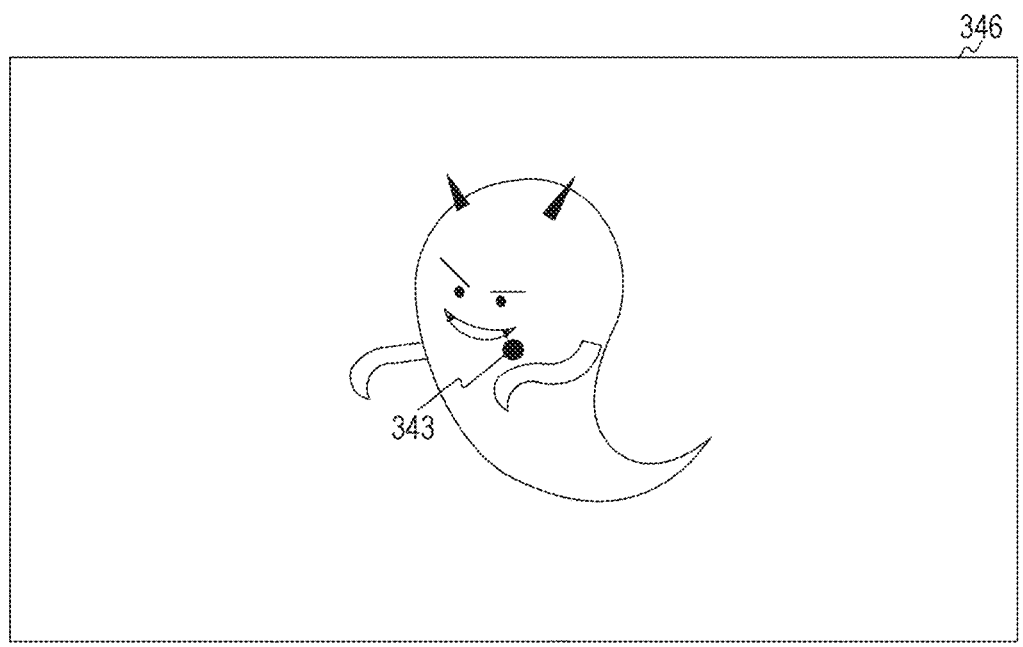
b

FIG. 15
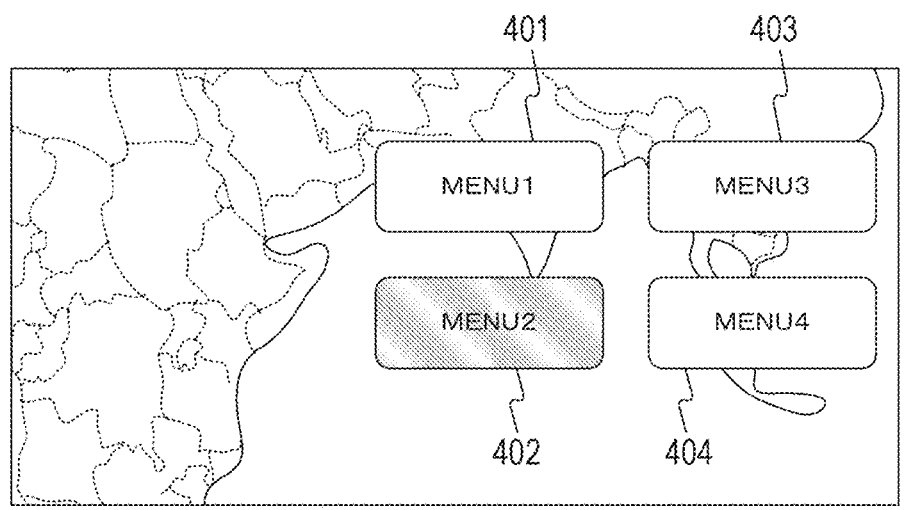
a
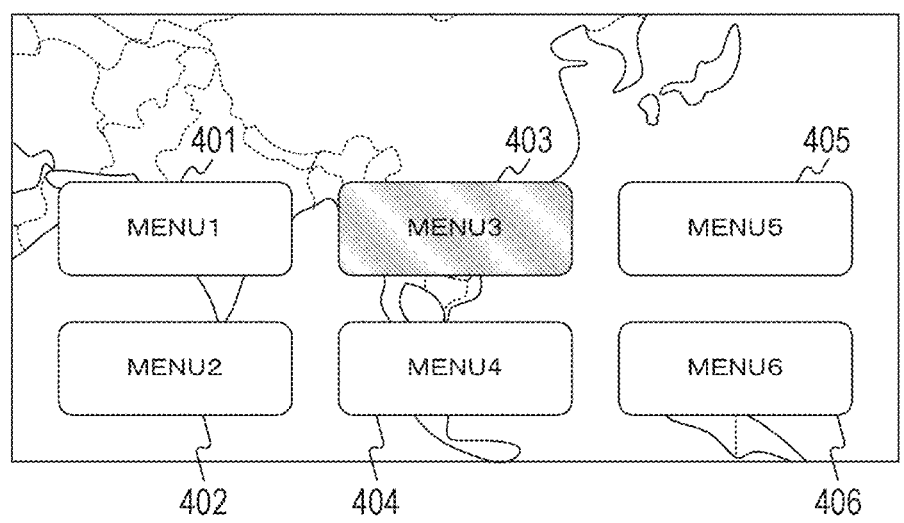
b

FIG. 17
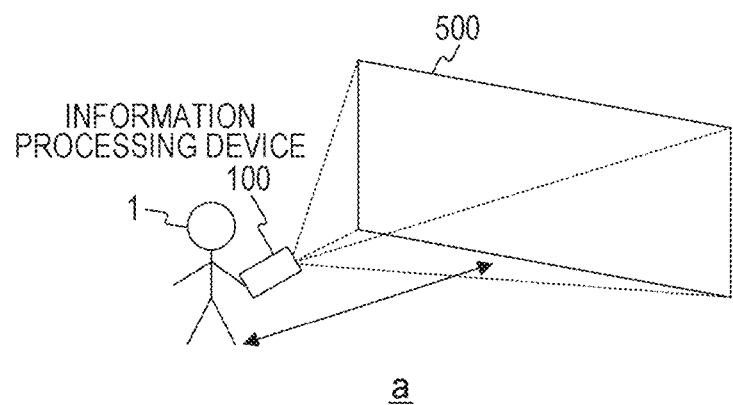
a
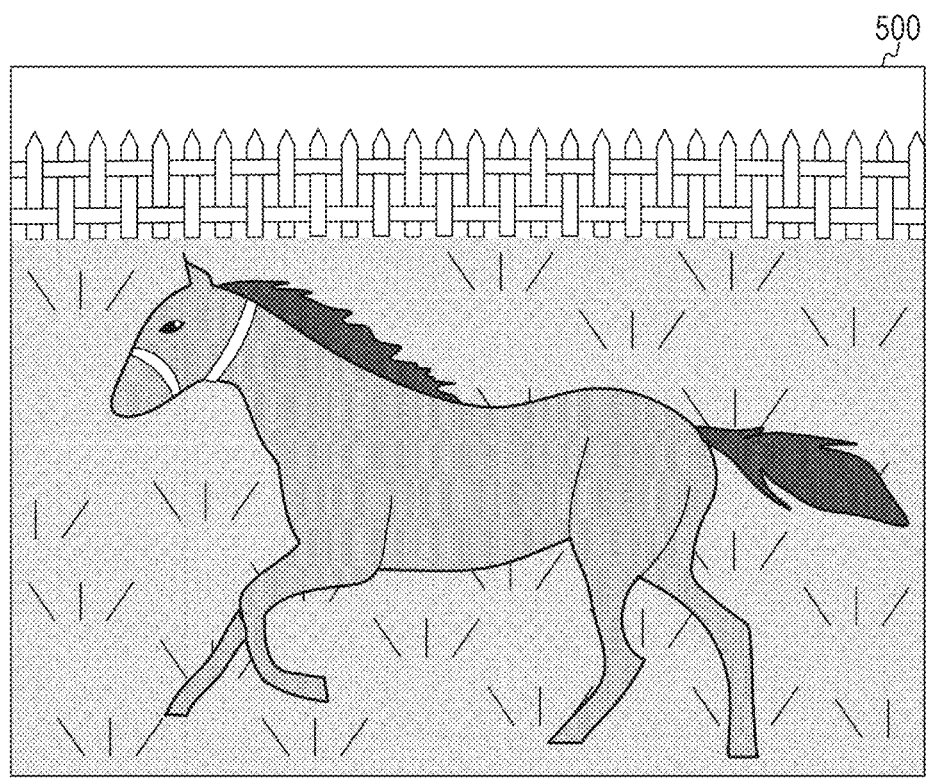
b

FIG. 18
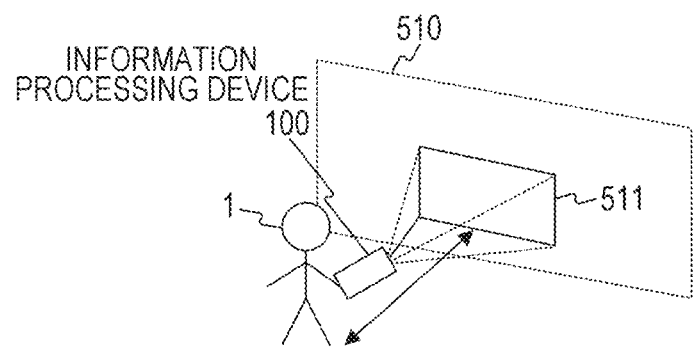
a
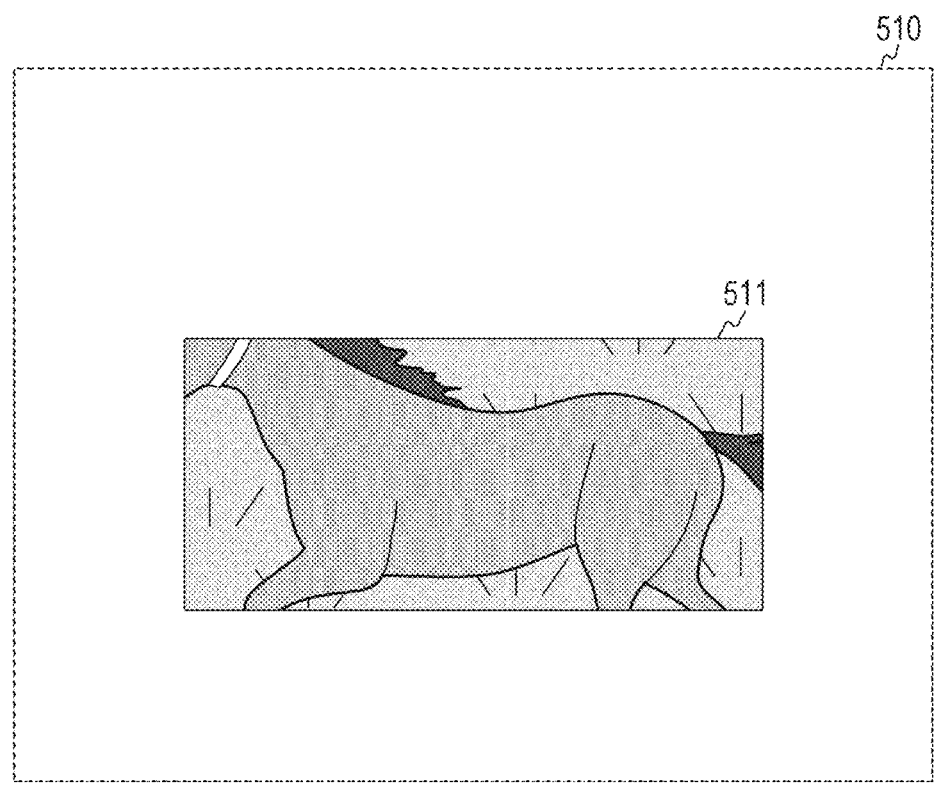
b

FIG. 19
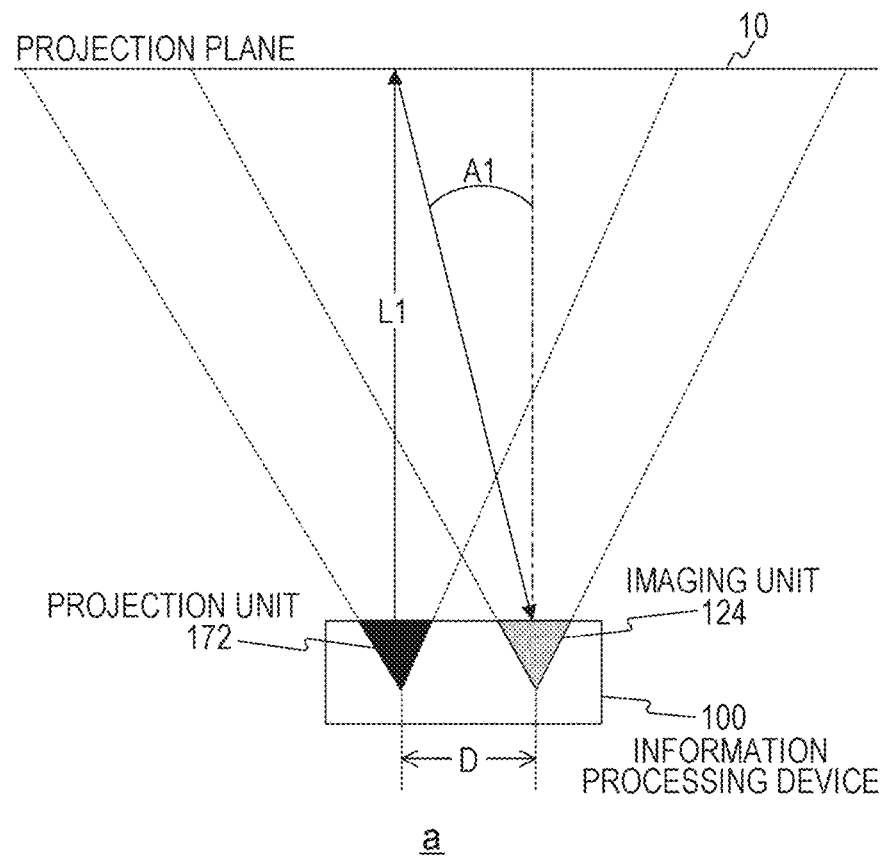
a
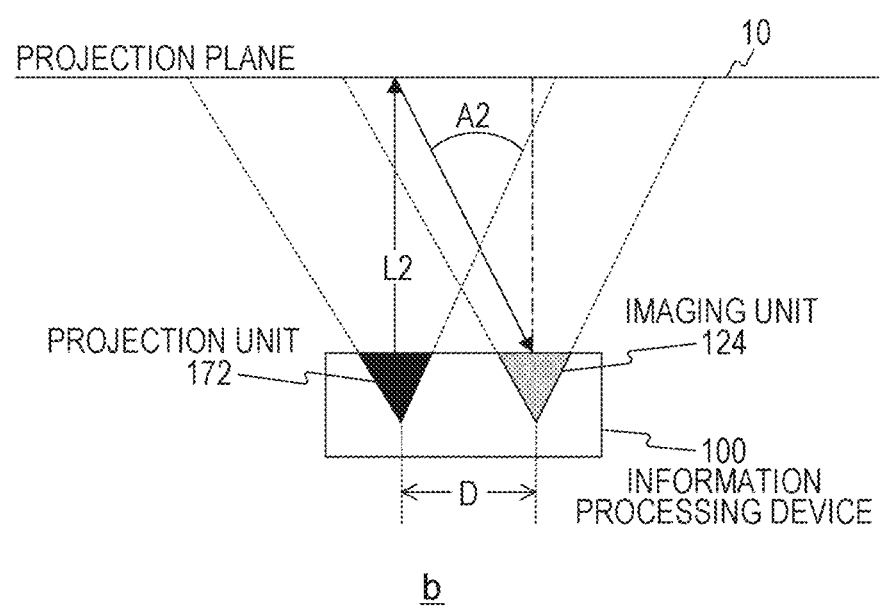
b

INFORMATION PROCESSING DEVICE AND INFORMATION PROCESSING METHOD

CROSS REFERENCE TO RELATED APPLICATION

This application is a U.S. National Phase of International Patent Application No. PCT/JP2015/051339 filed on Jan. 20, 2015, which claims priority benefit of Japanese Patent Application No. JP 2014-097575 filed in the Japan Patent Office on May 9, 2014. The above-referenced application is hereby incorporated herein by reference in its entirety.

TECHNICAL FIELD

The present technology relates to an information processing device. In detail, the present technology relates to an information processing device and an information processing method for projecting and display an image on a projection plane and to a program for causing a computer to execute such a method.

BACKGROUND ART

There has been an information processing device for displaying an image. For example, information processing devices such as projector for projecting an image on a screen and displaying the image on the screen have been proposed.

For example, a video display system including a projector for projecting a partial video image to be displayed on a view area of a projection screen with a gyro function or the like has been proposed (for example, see Patent Document 1).

CITATION LIST

Patent Document

Patent Document 1: Japanese Patent Application Laid-Open No. 2011-85712

SUMMARY OF INVENTION

Problems to be Solved by the Invention

According to the technology known to the inventors described above, it is possible to display an image according to a user's direction on a projection plane.

Here, for example, it is important to have display control to further increase user experience in addition to displaying an image according to a user's direction on a projection plane.

The present technology has been developed in consideration of the circumstances described above, and the purpose of the present technology is to properly control display of an image projected on a projection plane.

Solutions to Problems

The present technology has been developed in order to solve the problems described above and its first aspect is an information processing device including a control unit for controlling an image displayed on a projection plane on the basis of a display area of the image displayed on the projection plane specified on the basis of a relative positional relationship between a projection unit for projecting and displaying a part of an image to be displayed on the projection plane and the projection plane and control information associated with the image to be displayed, its information processing method, and a program for causing a computer to execute such a method. Accordingly, an effect is provided that an image displayed on a projection plane is controlled on the basis of a display area of the image displayed on the projection plane specified on the basis of a relative positional relationship between a projection unit and the projection plane and control information associated with the image to be displayed.

Furthermore, according to the first aspect, the control unit may display several item images on the projection plane on the basis of the control information and turn the predetermined number of item images out of the several item images into a selected state on the basis of a display position of the several item images displayed on the projection plane. Accordingly, an effect is provided that several item images are displayed on the projection plane on the basis of control information and the certain number of item images out of the several item images are turned into selected state on the basis of a position of display of the several item images displayed on the projection plane.

Furthermore, according to the first aspect, the control unit may display a background image as the image to be displayed and display the several item images on the background image on the basis of the control information. Accordingly, an effect is provided that several item images are displayed on a background image.

The information processing device according to the first aspect further includes a posture detection unit for detecting a posture of the projection unit, wherein the control unit changes a display area of the image displayed on the projection plane on the basis of the detected posture of the projection unit.

Accordingly, an effect is provided that a display area of an image displayed on a projection plane is changed on the basis of the posture of the projection unit.

Furthermore, according to the first aspect, the control unit may control a mode of display of the image displayed on the projection plane on the basis of the display area of the image after the change and the control information associated with the image. Accordingly, an effect is provided that form of display of an image displayed on a projection plane is controlled on the basis of a display area of the image after change and control information associated with the image.

Furthermore, according to the first aspect, the control unit may output sound regarding the image displayed on the projection plane on the basis of the display area of the image after the change and the control information associated with the image. Accordingly, an effect is provided that sound that relates to an image displayed on a projection plane is output on the basis of a display area of the image after change and control information associated with the image.

Furthermore, according to the first aspect, the control information may include information on an object included in the image to be displayed, and the control unit may display information on the object included in the image displayed on the projection plane. Accordingly, an effect is provided that information that relates to an object included in an image displayed on a projection plane is displayed.

Furthermore, according to the first aspect, the control unit may display assist information for displaying the image including the object when the image displayed on the projection plane does not include the object. Accordingly, an effect is provided that assist information for displaying an image including an object is displayed when the image displayed on the projection plane does not include the object.

Furthermore, according to the first aspect, the control unit may display a question for displaying the object, and produce a specific effect regarding the object when the object is included in the image displayed on the projection plane after the display of the question. Accordingly, an effect is provided that a question for displaying an object is displayed and a specific effect that relates to the object is provided when the image displayed on the projection plane includes that object after the question is displayed.

Furthermore, according to the first aspect, the control unit may produce a specific effect regarding a specific object when a specific user operation is accepted while the specific object is included in the image displayed on the projection plane. Accordingly, if a specific user operation is accepted when an image displayed on a projection plane includes a specific object, an effect is provided that a specific effect that relates to the specific object is produced.

Furthermore, according to the first aspect, the control information may include track information in which a track of change of the detected posture of the projection unit is associated with the image to be displayed, and the control unit may display information on the track associated with the image displayed on the projection plane. Accordingly, an effect is provided that information that relates to a track associated with an image displayed on a projection plane is displayed.

Furthermore, according to the first aspect, the control unit further comprises a distance detection unit for detecting a distance between the information processing device and the projection plane, and the control unit changes a display area of the image displayed on the projection plane on the basis of the detected distance. Accordingly, an effect is provided that the display area of an image displayed on a projection plane is changed on the basis of the distance between the information processing device and the projection plane.

Furthermore, according to the first aspect, the control unit may display an image associated with at least one piece of information of an orientation, a posture, and position information of an image capture device when capturing the image as the image to be displayed and change a display area of the image displayed on the projection plane on the basis of that information. Accordingly, an effect is provided that an image associated with at least one piece of information out of orientation, posture, and position information of the image capture device when capturing an image is displayed and that the display area of an image displayed on a projection plane is changed on the basis of that information.

Effects of the Invention

According to the present technology, an excellent effect is provided that display of an image projected on a projection plane is properly controlled. Note that, an effect described herein is not necessarily limited and may be any effect described in the present disclosure.

BRIEF DESCRIPTION OF DRAWINGS

FIG. 3 shows an example of contents in a spatial position action memory 141 according to the first embodiment of the present technology.

FIGS. 10a and 10b show examples of images projected by the information processing device 100 according to the first embodiment of the present technology.

FIGS. 15a and 15b show an example of shift of display of a projection image displayed by the information processing device 100 according to the second embodiment of the present technology.

FIGS. 17a and 17b show a relation between the distance between the information processing device 100 according to the third embodiment of the present technology and a projection plane and an image projected on the projection plane by the information processing device 100.

FIGS. 18a and 18b show a relation between the distance between the information processing device 100 according to the third embodiment of the present technology and a projection plane and an image projected on the projection plane by the information processing device 100.

FIGS. 19a and 19b simplistically show the information processing device 100 according to the first embodiment of the present technology and a projection plane 10 seen from above.

MODE FOR CARRYING OUT THE INVENTION

Hereinafter, modes for carrying out the present technology (hereinafter referred to as embodiments) will be described. The description will be made in the following order.

1. First embodiment (an example in which an image displayed on a projection plane is controlled on the basis of a spatial position action definition)
2. Second embodiment (an example in which a desired item image is selected from several item images)
3. Third embodiment (an example in which the display area of a projected image is changed on the basis of the distance between an information processing device and a projection plane)

1. First Embodiment

Example of Use of Information Processing Device

Figure 1:
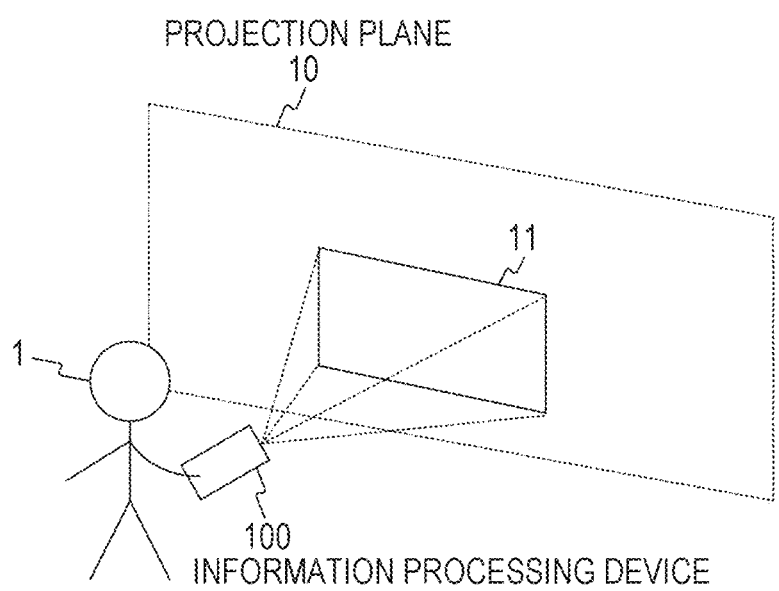
FIG. 1 shows an example of use of an information processing device 100 according to the first embodiment of the present technology.

FIG. 1 shows an example of use of an information processing device 100 according to the first embodiment of the present technology.

The information processing device 100 is an image projection device (for example, projector) for displaying an image 11 on a projection plane 10 by projecting (projecting) an image on the projection plane (projection screen plane) 10. Note that, in FIG. 1, screen, wall, ceiling, or the like with a flat (or non-flat) plane that can display an image is schematically shown as the projection plane 10. In addition, in FIG. 1, the image 11 projected by the information processing device 100 is schematically shown by a rectangular outline. Note that, image described in the embodiments of the present technology includes video image.

In addition, in the embodiments of the present technology as shown in FIG. 1, a portable information processing device 100 that can project an image on the projection plane 10 held by a user 1 is described as an example.

[Example of Configuration of Information Processing Device]

Figure 2:
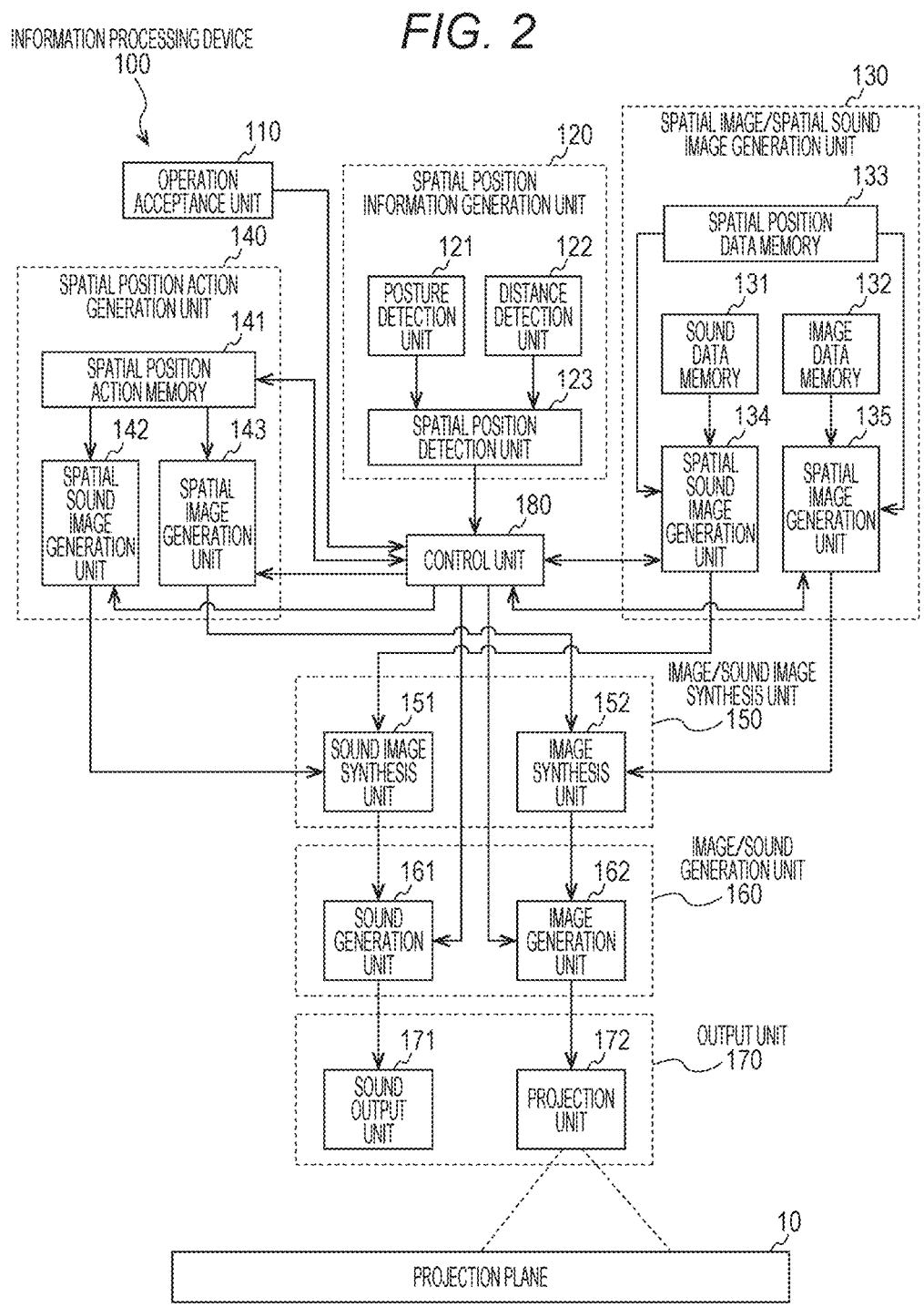
FIG. 2 is a block diagram showing an example of a functional configuration of the information processing device 100 according to the first embodiment of the present technology.

FIG. 2 is a block diagram showing an example of a functional configuration of the information processing device 100 according to the first embodiment of the present technology.

The information processing device 100 includes an operation acceptance unit 110, a spatial position information generation unit 120, a spatial image/spatial sound image generation unit 130, a spatial position action generation unit 140, an image/sound image synthesis unit 150, an image/sound generation unit 160, an output unit 170, and a control unit 180. Note that, the projection plane 10 is a projection plane (for example, screen such as projector module) that displays an image projected by a projection unit 172.

The operation acceptance unit 110 is an operation acceptance unit for accepting an operation input by a user and outputs operation information in accordance with the accepted operation input to the control unit 180. The operation acceptance unit 110 is realized by, for example, touch panel, keyboard, button (for example, determination button 111 shown in FIG. 11), mouse, and sensor.

The spatial position information generation unit 120 generates information regarding spatial position (spatial position information) such as posture and projection direction of the projection unit 172 and the distance between the projection unit 172 and the projection plane 10, and outputs the generated spatial position information to the control unit 180. Specifically, the spatial position information generation unit 120 includes a posture detection unit 121, a distance detection unit 122, and a spatial position detection unit 123.

The posture detection unit 121 detects the posture of the projection unit 172 (including the direction the projection unit 172 projects an image (projection direction)) and outputs the detected posture (projection direction) to the spatial position detection unit 123. For example, posture detection unit 121 can detect the posture and the projection direction of the projection unit 172 with a censor such as gyroscope, acceleration sensor, and compass. Note that, for example, the projection direction can be the direction (angle from reference direction) when the certain direction (for example, direction when turning on power) is the reference direction (for example, 0°). In addition, orientation the projection unit 172 projects an image (projection orientation) may be detected instead of the projection direction. The projection orientation can be detected by, for example, an orientation sensor that measures orientation on the earth with geomagnetism.

The distance detection unit 122 detects the distance between the projection unit 172 and the projection plane 10 and outputs the detected distance to the spatial position detection unit 123. For example, the distance detection unit 122 detects the distance between the projection unit 172 and the projection plane 10 with a distance sensor such as infrared ray. In addition, the distance detection unit 122 captures an image projected by the projection unit 172 with an image capture device (imaging unit 124 shown in FIGS. 19a and 19b) and detects misalignment of the captured image to detect the distance.

The spatial position detection unit 123 detects spatial position of the projection unit 172 on the basis of the posture and the projection direction detected by the posture detection unit 121 and the distance detected by the distance detection unit 122. Then, the spatial position detection unit 123 outputs information regarding the detected spatial position (spatial position information) to the control unit 180. In addition, the control unit 180 outputs the spatial position information to each unit.

The spatial image/spatial sound image generation unit 130 generates virtual spatial image/spatial sound image on the basis of image data such as panoramic image, 360° image, and omnidirectional image. In this case, when spatial position data is stored in the spatial position data memory 133, the spatial image/spatial sound image generation unit 130 generates virtual spatial image/spatial sound image in consideration of that spatial position data.

Specifically, the spatial image/spatial sound image generation unit 130 includes a sound data memory 131, an image data memory 132, a spatial position data memory 133, a spatial sound image generation unit 134, and a spatial image generation unit 135.

The sound data memory 131 stores sound data and supplies the stored sound data to the spatial sound image generation unit 134.

The image data memory 132 stores image data and supplies the stored image data to the spatial image generation unit 135.

The spatial position data memory 133 stores spatial position data regarding each of the sound data stored in the sound data memory 131 and the image data stored in the image data memory 132. Then, the spatial position data memory 133 supplies the stored spatial position data to the spatial sound image generation unit 134 and the spatial image generation unit 135.

Here, spatial position data will be described.

For example, when sound data and image data are data stored by image capturing operation of an image capture device, spatial position data will be data such as posture and optical axis direction of the image capture device, distance between the image capture device and the object, and angle of view of the lens at image capturing operation. In this case, spatial position data is stored in association with sound image data and image data stored by image capturing operation. Note that, the image capture device is, for example, digital still camera and digital video camera (for example, camcorder).

For example, data stored in data format of Photo Sphere XMP Metadata can be used as spatial position data. Note that, Photo Sphere XMP Metadata is metadata of an omnidirectional still image.

In addition, in the embodiment of the present technology, the following (1) to (3) out of data formats of Photo Sphere XMP Metadata can be mainly used.
(1) GPano:PoseHeadingDegrees
(2) GPano:PosePitchDegrees
(3) GPano:PoseRollDegrees For example, the spatial image generation unit 135 determines position, posture, and size for mapping a spatial image on the basis of the spatial position data to generate a spatial image. An example of generation will be described in the third embodiment of the present technology.

In the data format of Photo Sphere XMP Metadata, moving image is not defined. Then, the spatial position data described above is stored together with time information in chronological order and the spatial position data described above can be used in synchronization with the time information when the moving image is played. Accordingly, for example, posture can be corrected when the moving image is played.

For example, in an image of an omnidirectional moving image recorded during diving, recording such spatial position data as chronological data makes it possible to display an image with the direction the user wants to see without being influenced by the recording direction of the diver.

In addition, although information regarding posture and orientation is defined in the data format of Photo Sphere XMP Metadata, information regarding the distance to the object is not defined. Then, the spatial position data described above is stored together with information regarding the distance to the object, and the information regarding the distance to the object can be used when an image is played. For example, when there are an image of an elephant existing 10 m away in the north and an image of a cat existing 1 m away in the south, mapping on the spatial position in accordance with the distance makes it possible to reproduce the difference in size.

The spatial sound image generation unit 134 generates a spatial sound image with the sound data stored in the sound data memory 131 and the spatial position data stored in the spatial position data memory 133 on the basis of the control of the control unit 180. Then, the spatial sound image generation unit 134 outputs the generated spatial sound image to a sound image synthesis unit 151.

The spatial image generation unit 135 generates a spatial image with the image data stored in the image data memory 132 and the spatial position data stored in the spatial position data memory 133 on the basis of the control of the control unit 180. Then, the spatial image generation unit 135 outputs the generated spatial image to an image synthesis unit 152.

The spatial position action generation unit 140 generates effects of the spatial image and the spatial sound image in accordance with the spatial position generated by the spatial position information generation unit 120. The spatial position action generation unit 140 realizes, for example, a drawing function with display of constellation on a pointer and a trace of the pointer on an omnidirectional planetarium.

Specifically, the spatial position action generation unit 140 includes a spatial position action memory 141, a spatial sound image generation unit 142, and a spatial image generation unit 143.

Figure 12:
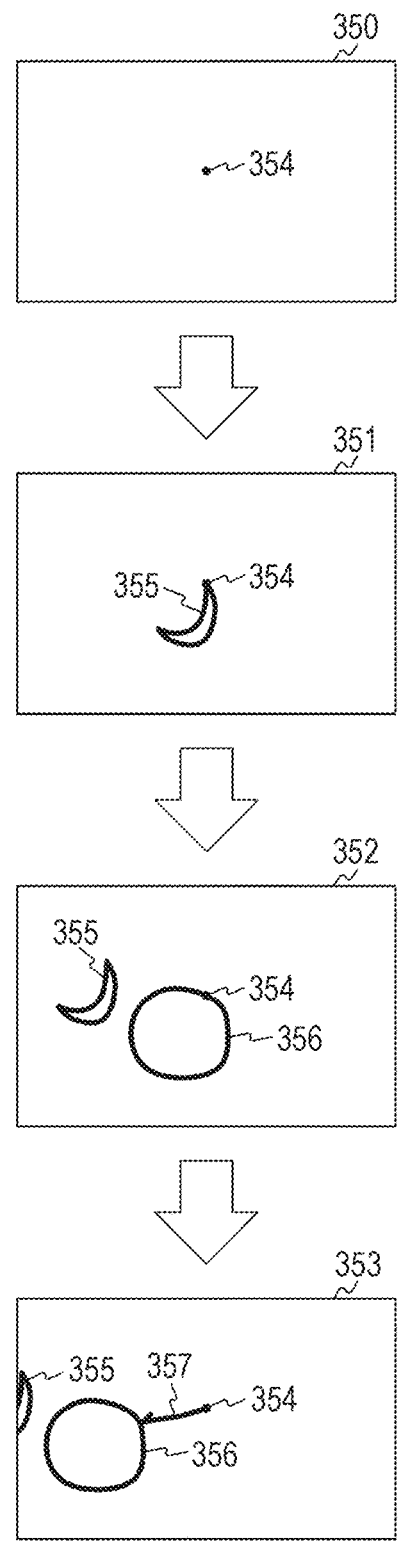
FIG. 12 shows an example of shift of images 350 to 353 projected by the information processing device 100 according to the first embodiment of the present technology.
Figure 13:
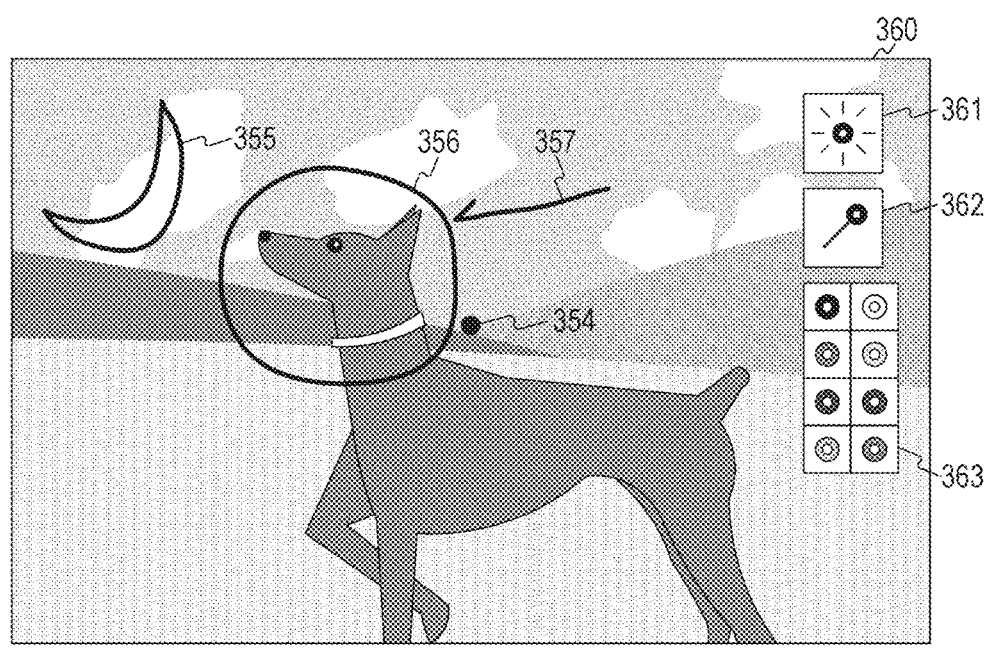
FIG. 13 shows an example of display of an image projected by the information processing device 100 according to the first embodiment of the present technology.

The spatial position action memory 141 stores action definitions for each spatial position and supplies the stored action definitions for each spatial position to the spatial sound image generation unit 142, the spatial image generation unit 143, and the control unit 180. In addition, as shown in FIGS. 12 and 13, when something is being drawn, information regarding the trace will be sequentially stored in the spatial position action memory 141 by the control unit 180. That is, the control unit 180 correlates the trace regarding change of the posture of the projection unit 172 and an image to be displayed to sequentially store in the spatial position action memory 141.

The spatial sound image generation unit 142 generates a spatial sound image on the basis of the control of the control unit 180 and outputs the generated spatial sound image to the sound image synthesis unit 151. For example, the spatial sound image generation unit 142 generates a spatial sound image with the action definitions for each spatial position stored in the spatial position action memory 141 on the basis of the spatial position information generated by the spatial position information generation unit 120. In addition, for example, the spatial sound image generation unit 142 generates a sound image so that sound is generated from the right of the position that is being pointed.

The spatial image generation unit 143 generates a spatial image on the basis of the control of the control unit 180 and outputs the generated spatial image to the image synthesis unit 152. For example, the spatial image generation unit 143 generates a spatial image with the action definitions for each spatial position stored in the spatial position action memory 141 on the basis of the spatial position information generated by the spatial position information generation unit 120.

The image/sound image synthesis unit 150 includes the sound image synthesis unit 151 and the image synthesis unit 152.

The sound image synthesis unit 151 synthesizes (superimposes) the spatial sound image generated by the spatial image/spatial sound image generation unit 130 and the spatial sound image generated by the spatial position action generation unit 140 and outputs the synthesized spatial sound image to a sound generation unit 161.

The image synthesis unit 152 synthesizes (superimposes) the spatial image generated by the spatial image/spatial sound image generation unit 130 and the spatial image generated by the spatial position action generation unit 140 and outputs the synthesized spatial image to an image generation unit 162.

The image/sound generation unit 160 includes the sound generation unit 161 and the image generation unit 162.

The sound generation unit 161 cuts out sound from the spatial sound image synthesized by the sound image synthesis unit 151 on the basis of the spatial position information generated by the spatial position information generation unit 120 to generate sound to be output. Then, the sound generation unit 161 outputs the generated sound to a sound output unit 171. Note that, the spatial position information includes the posture and the projection direction of the projection unit 172 and the distance between the projection unit 172 and the projection plane 10.

The image generation unit 162 cuts out an image from the spatial image synthesized by the image synthesis unit 152 on the basis of the spatial position information generated by the spatial position information generation unit 120 to generate an image to be output. Then, the image generation unit 162 outputs the generated image to the projection unit 172.

The output unit 170 includes the sound output unit 171 and the projection unit 172.

The sound output unit 171 is a sound output device (for example, speaker) for outputting the sound generated by the sound generation unit 161.

The projection unit 172 is an image output device for projecting the image generated by the image generation unit 162 on the projection plane 10. That is, the projection unit 172 projects and displays a part of the image to be displayed on the projection plane 10.

The control unit 180 controls each unit of the information processing device 100 on the basis of a control program. For example, the control unit 180 controls an image displayed on the projection plane 10 on the basis of the display area of the image displayed on the projection plane 10 specified by relative positional relationship between the projection unit 172 and the projection plane 10 and control information associated with the image to be displayed. Here, the control information is, for example, each piece of information stored in the spatial position action memory 141.

Figure 4:
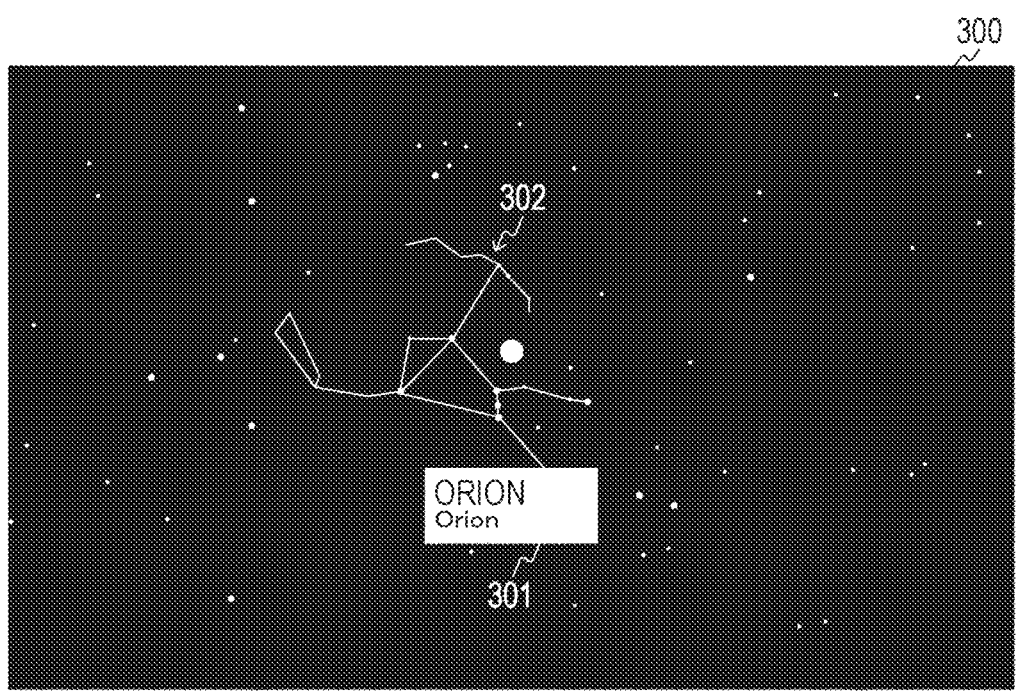
FIG. 4 shows an example of display of an image projected by the information processing device 100 according to the first embodiment of the present technology.
Figure 11:
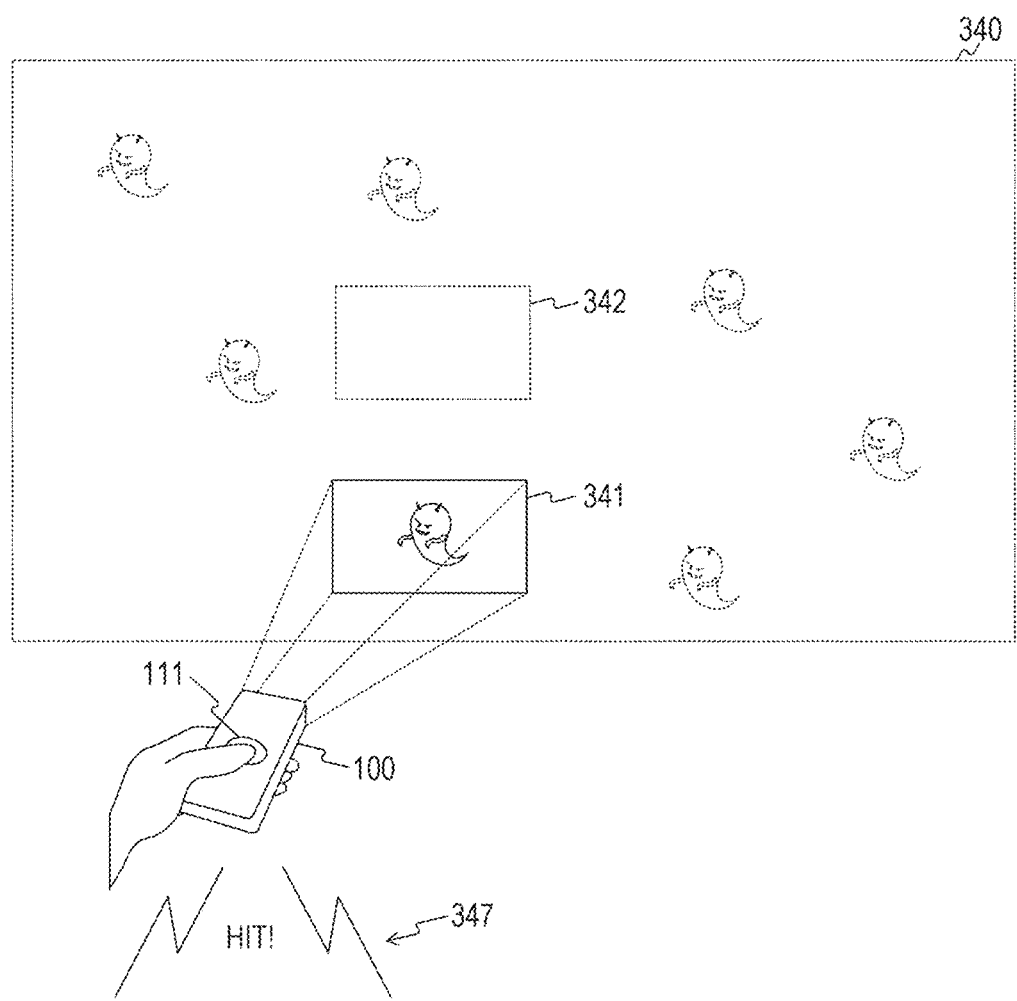
FIG. 11 simplistically shows a case where a shooting game is played with the information processing device 100 according to the first embodiment of the present technology.

For example, the control unit 180 changes the display area of the image to be displayed on the projection plane 10 on the basis of the posture of the projection unit 172. In this case, the control unit 180 controls the form of display of the image displayed on the projection plane 10 on the basis of the display area of the image to be displayed on the projection plane 10 and the control information associated with that image. For example, as shown in FIG. 4, information regarding star or constellation can be displayed. In addition, for example, the control unit 180 can cause sound regarding the image displayed on the projection plane 10 to be output on the basis of the display area of the image to be displayed on the projection plane 10 and the control information associated with that image. For example, as shown in FIG. 11, sound indicating "hit" can be output.

[Example of Contents in Spatial Position Action Memory]

FIG. 3 shows an example of contents in the spatial position action memory 141 according to the first embodiment of the present technology.

The spatial position action memory 141 stores operation mode 201, data type 202, spatial position information type 203, spatial position information 204, action definition 205, and additional information 206 which are associated with one another.

In the operation mode 201, operation mode for projecting an image by the information processing device 100 is stored. In FIG. 3, an example in which each operation mode of planetarium, spatial position quiz, shooting, and drawing is stored as the operation mode 201 is shown. In addition, each operation mode is set on the basis of the user operation via the operation acceptance unit 110, for example.

Figure 5:
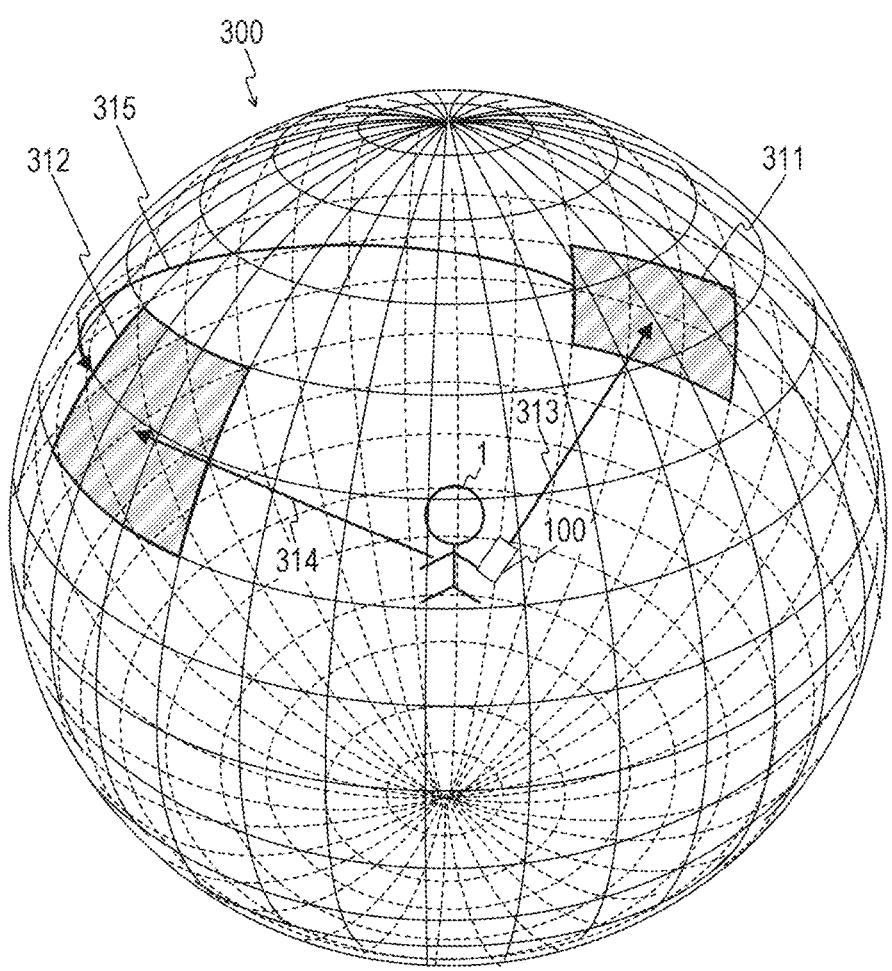
FIG. 5 schematically shows a relation between the information processing device 100 according to the first embodiment of the present technology and omnidirectional image data to be displayed.
Figure 6:
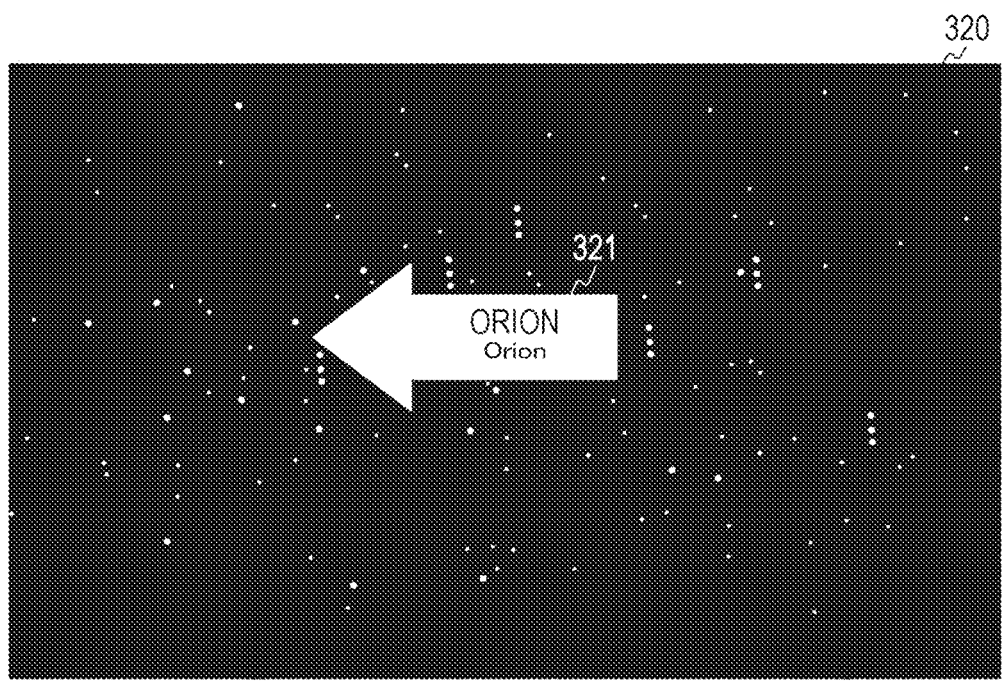
FIG. 6 shows an example of display of an image projected by the information processing device 100 according to the first embodiment of the present technology.

Planetarium is an operation mode in which images (or light) of celestial stars, movement of stars, and the like are projected on the projection plane 10 and stars, movement of stars, and the like are reproduced on the projection plane 10. Note that, an example of display in which planetarium is set as an operation mode is shown in FIGS. 4 to 6.

For example, when planetarium is set as an operation mode, action definition is executed when the display area (area according to posture of the information processing device 100) of the image on the projection plane 10 becomes the spatial position of a particular star or constellation (or comes closer to the spatial position). In addition, when the posture of the information processing device 100 is changed by the user, action definition is executed when the display area after the change becomes the spatial position of a particular star or constellation (or comes closer to the spatial position). Here, whether or not the display area becomes the spatial position of a particular star or constellation is determined on the basis of, for example, the information stored in the spatial position information 204.

Figure 8:
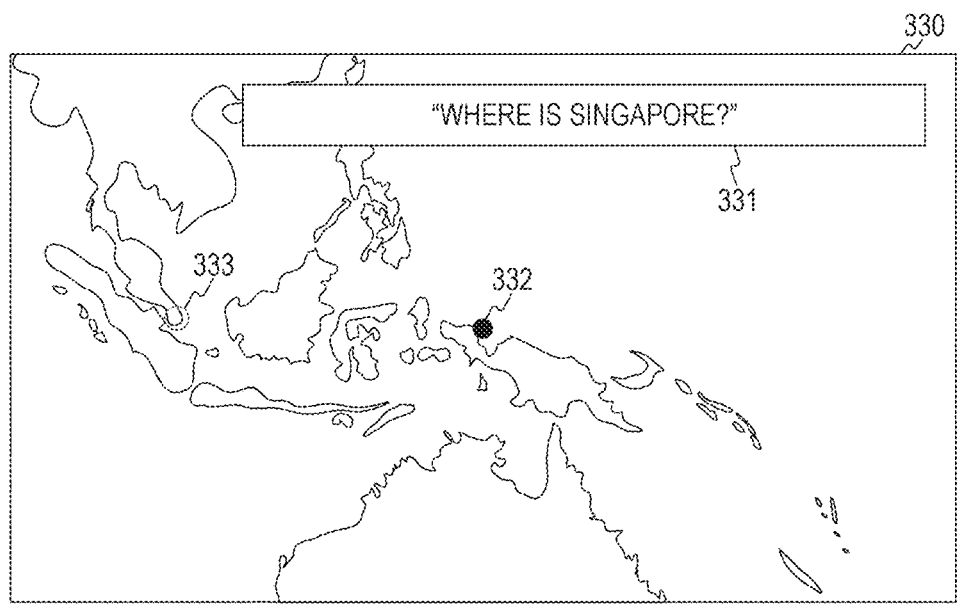
FIG. 8 shows an example of display of an image projected by the information processing device 100 according to the first embodiment of the present technology.

The spatial position quiz is an operation mode in which an image such as map is projected on the projection plane 10 and a quiz (question) regarding the image is displayed together with the image (for example, map) displayed on the projection plane 10. Note that, an example of display when the spatial position quiz is set as an operation mode is shown in FIG. 8.

For example, the spatial position quiz is an operation mode in which spatial position data is randomly selected, its action definition is executed, and a user action for the spatial position is waited for. In addition, in the spatial position quiz, a correct answer action is performed if the spatial position is near when user's action is performed (when change of the posture of the information processing device 100 is made by the user) and an incorrect answer action is performed if the spatial position is far when user's action is performed.

Figure 9:
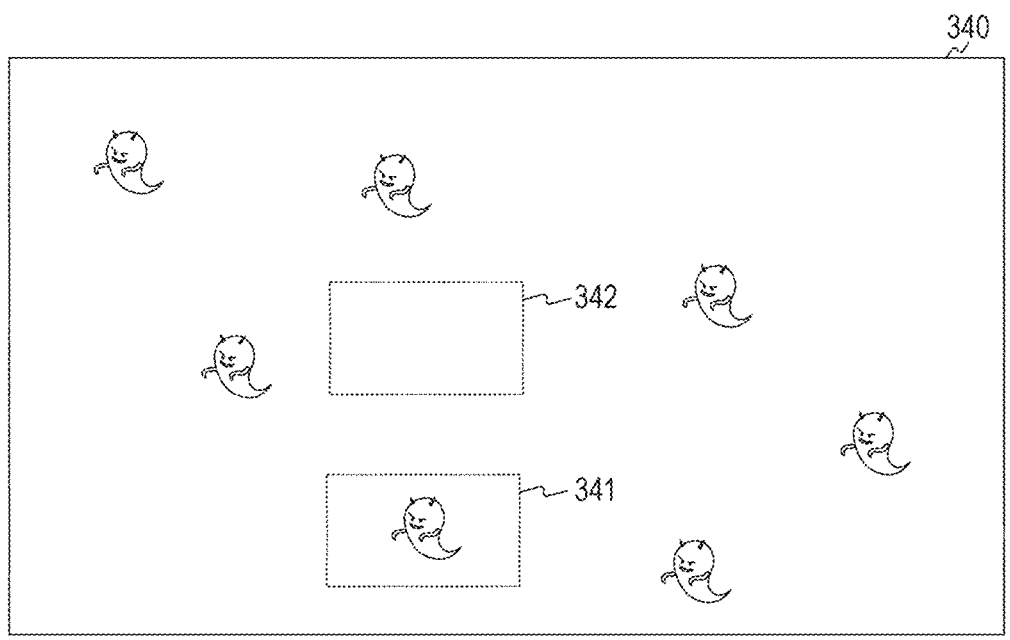
FIG. 9 shows an example of an image projected by the information processing device 100 according to the first embodiment of the present technology.

The shooting is an operation mode in which an object as a target (for example, ghost image) is projected on the projection plane 10, and a computer game for shooting down the object (for example, ghost image) displayed on the projection plane 10 is played. Note that, an example of display when the shooting is set as an operation mode is shown in FIGS. 9 to 11.

For example, the shooting is an operation mode in which actions for all target data are performed in the beginning and the user action is waited for. In the shooting, hit action is performed if the spatial position is near when user's action is performed.

The drawing is an operation mode in which the posture of the information processing device 100 is changed to draw track information such as line on the image displayed on the projection plane 10. Note that, an example of display when the drawing is set as an operation mode is shown in FIGS. 12 and 13.

For example, the drawing is an operation mode in which information on the spatial position, the color, and the line width is sequentially stored when user's action is performed. In the drawing, all of drawing data is always executed in accordance with actions.

Type of data to be displayed is stored in the data type 202. For example, when the planetarium is set as an operation mode, since a star, a constellation, Milky Way, and the like are displayed, data type corresponding to these is stored in the data type 202.

Type of information for specifying the spatial position is stored in the spatial position information type 203. For example, as a type for displaying a star or a constellation ("position data of star" and "data of constellation" in the data type 202), equatorial coordinates are used. In addition, as information for specifying the spatial position on the spherical surface, polar coordinates (spherical coordinates) $(r, \theta, \phi)$ and orthogonal coordinates $(x, y, z)$ may be used. In addition, information with spherical coordinates as values of latitude and longitude (latitude, longitude, radius of spherical surface) may be used.

Information for specifying the spatial position is stored in the spatial position information 204. For example, when a star or a constellation ("position data of star" and "data of constellation" in the data type 202) is to be displayed, equatorial coordinates are used as described above. For example, equatorial coordinates are represented by two values of right ascension and declination. For example, right ascension "2 h32 m" and declination "+89" are stored in the spatial position information 204 regarding "polar star."

If the spatial position specified by the spatial position information 204 is included in the display area, actions to be executed are stored in the action definition 205. For example, since "display additional information on spatial position" is stored in the action definition 205 regarding "Orion," information on Orion is displayed. For example, information on Orion is displayed as shown in FIG. 4.

Additional information to be used to perform the action definition 205 is stored in the additional information 206. For example, additional information for displaying information on Orion is stored in the additional information 206 on "Orion." For example, additional information for displaying information on Orion is stored as shown in FIG. 4.

Note that, although an example in which only names of constellations are stored in the additional information 206 is shown in FIG. 3 to simplify the description, other information than names of constellations can also be stored. For example, the name of constellation and the line of constellation may be stored in the additional information 206 and the name of constellation and the line of constellation can be drawn as shown in FIG. 4.

Note that, although FIG. 3 shows examples of operation modes of planetarium, spatial position quiz, shooting, and drawing as the operation mode 201, the spatial position action memory 141 may store other operation modes.

[Example of Display when Planetarium is Set]

FIG. 4 shows an example of display of an image projected by the information processing device 100 according to the first embodiment of the present technology. FIG. 4 shows an example of display when the planetarium is set as an operation mode.

FIG. 5 schematically shows a relation between the information processing device 100 according to the first embodiment of the present technology and omnidirectional image data to be displayed. Note that, in FIG. 5, omnidirectional image data is schematically shown and stars or constellations are omitted. In addition, omnidirectional image data of the star shown in FIG. 5 is stored in the image data memory 132.

For example, the posture detection unit 121 detects the direction of the projection unit 172 (projection direction). The projection unit 172 projects the star in the projection direction detected by the posture detection unit 121 on the projection plane 10. For example, when the direction of an arrow 314 shown in FIG. 5 is detected by the posture detection unit 121, the projection unit 172 projects the image (star, constellation) included in an area 312 corresponding to the direction of the arrow 314 on the projection plane 10. For example, an image 300 shown in FIG. 4 is displayed on the projection plane 10. Accordingly, so-called planetarium can be realized.

Here, for example, when an area including the position stored in the spatial position information 204 of the spatial position action memory 141 is displayed, processing based on the contents stored in the action definition 205 is performed.

For example, when the planetarium is set as an operation mode and an area including the position of equatorial coordinates "5 h30 m, +3" is displayed, the contents of the additional information 206 are displayed together with an image of a star. For example, as shown in FIG. 4, a mark 301 of "Orion Orion" and lines 302 connecting stars are displayed on the image 300 including stars of Orion.

As described, the control unit 180 can display information (for example, the mark 301 of "Orion Orion" and the lines 302 connecting stars) on the object included in the image displayed on the projection plane 10 (for example, star and constellation).

Also, for example, an area including the position stored in the spatial position information 204 of the spatial position action memory 141 is not displayed, only the image of the star is displayed.

Note that, in the embodiment of the present technology, a case in which information is stored in the spatial position information 204 of the spatial position action memory 141 is referred to as a case in which a spatial position action is defined.

In addition, when the area in which a spatial position action is defined can be specified even if the area in which the spatial position action is not defined is displayed, the area in which the spatial position action is defined may be notified to the user. An example is shown in FIG. 6.

FIG. 6 shows an example of display of an image projected by the information processing device 100 according to the first embodiment of the present technology. In FIG. 6, an example of display when an area in which a spatial position action is defined is notified to the user is shown.

For example, in an example shown in FIG. 5, an area 311 is an area in which a spatial position action is not defined and the area 312 is an area in which a spatial position action is defined. In addition, a case in which the user 1 projects an image in the direction of an arrow 313 and an image included in the area 311 is displayed is assumed. In this case, the control unit 180 acquires the contents in the spatial position action memory 141 and can display an arrow 321 indicating that there is Orion in the direction of the arrow 314 on an image 320 as shown in FIG. 6. As described, it is possible to guide the user to an area in which the spatial position action is defined by displaying the arrow 321. For example, the user 1 can have Orion displayed by moving the projection direction of the projection unit 172 according to an arrow 315.

As described, the control unit 180 can display assist information (for example, arrow 321) for displaying an image including an object when the object (for example, Orion) is not included in the image displayed on the projection plane 10.

Note that, mode of display (for example, length, size, and color) of the arrow may be changed according to the distance to the position of the object (for example, Orion). In addition, when there are several objects, arrows each indicating each object may be displayed at the same time.

[Example of Operation of Information Processing Device]

Figure 7:
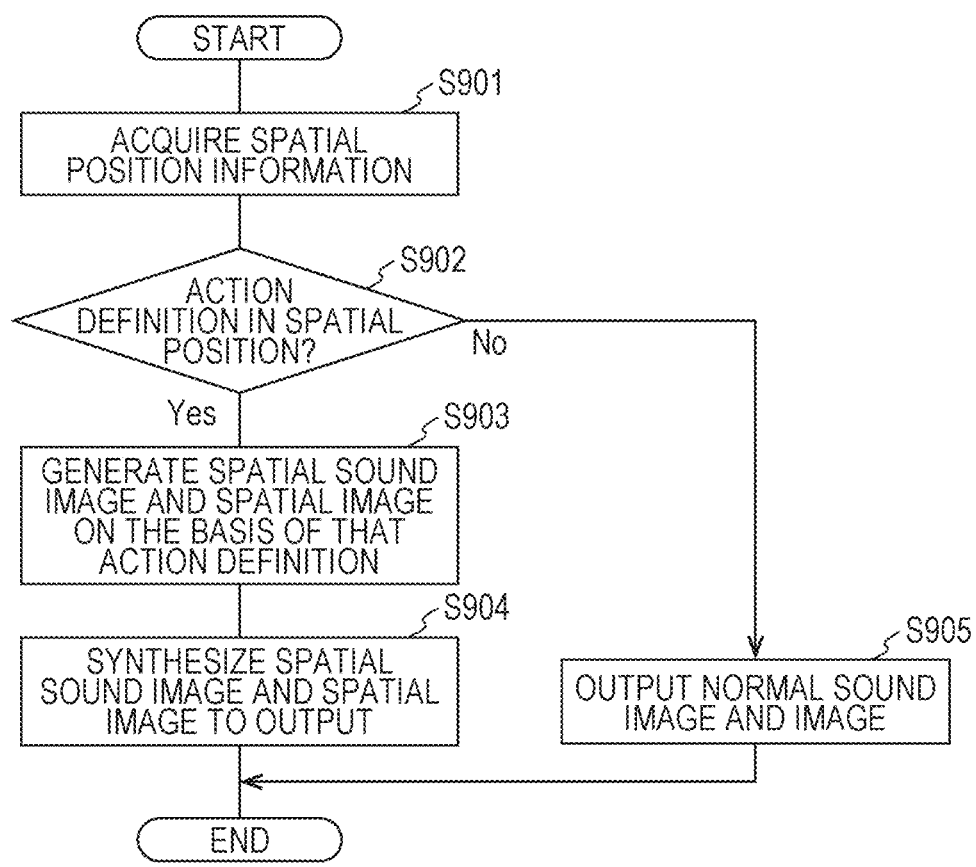
FIG. 7 is a flow chart showing an example of an image display process by the information processing device 100 according to the first embodiment of the present technology.

FIG. 7 is a flow chart showing an example of an image display process by the information processing device 100 according to the first embodiment of the present technology. Note that, the image display process is carried out on the basis of the control of the control unit 180.

First, the spatial position action generation unit 140 acquires spatial position information from the spatial position detection unit 123 (step S901).

Next, the spatial position action generation unit 140 determines whether or not there is a definition matching the spatial position information acquired from the spatial position detection unit 123 in the spatial position action definition of the spatial position action memory 141 (step S902). That is, the spatial position action generation unit 140 determines whether or not there is information corresponding to the spatial position information acquired from the spatial position detection unit 123 in the spatial position information 204 of the spatial position action memory 141 (step S902).

If there is no definition that matches the spatial position information acquired from the spatial position detection unit 123 in the spatial position action definition of the spatial position action memory 141 (step S902), normal sound image and image are output (step S905). That is, sound based on the spatial sound image generated by the spatial sound image generation unit 134 is output from the sound output unit 171 and an image based on the spatial image generated by the spatial image generation unit 135 is output from the projection unit 172.

In addition, if there is a definition that matches the spatial position information acquired from the spatial position detection unit 123 in the spatial position action definition of the spatial position action memory 141 (step S902), a spatial sound image and a spatial image are generated in accordance with that definition (step S903). That is, the spatial sound image generation unit 142 generates a spatial sound image on the basis of that spatial position action definition (step S903). In addition, the spatial image generation unit 143 generates a spatial image on the basis of that spatial position action definition (step S903).

Subsequently, the spatial sound image and the spatial image generated on the basis of the spatial position action definition and the spatial sound image and the spatial image generated on the basis of the spatial position data are synthesized with each other and the sound and image generated by the synthesis are output (step S904). That is, the sound synthesized by the sound image synthesis unit 151 is output from the sound output unit 171 and the image synthesized by the image synthesis unit 152 is output from the projection unit 172 (step S904). Note that, steps S902 to S905 are examples of control process described in the claims.

[Example of Display when Spatial Position Quiz is Set]

FIG. 8 shows an example of display of an image projected by the information processing device 100 according to the first embodiment of the present technology. In FIG. 8, an example of display when the spatial position quiz is set as an operation mode is shown. In addition, in FIG. 8, an example in which an omnidirectional world map is displayed and a city quiz is given on the world map when the spatial position quiz is set is shown.

For example, the spatial position and the name (city name) of each city are associated with each other to be defined as a spatial position action. Then, the control unit 180 randomly selects each defined city and displays the city name on the map. Then, the user changes the posture of the information processing device 100 and aligns the center position of the display area with the position of the city the name of which is displayed on the map. In this case, an action indicating that the correct answer to the quiz is given is performed at the timing when a predetermined user operation (for example, pressing of a determination button 111 shown in FIG. 11) is performed with the position of the city the name of which is displayed on the map being aligned with the center position of the display area. As described, a quiz for giving an answer by pointing the position of the city the name of which is displayed on the map can be realized.

For example, if Singapore (additional information 206 "Singapore (Singapore)" shown in FIG. 3) is selected from the defined cities, "Where is Singapore?" 331 is displayed as shown in FIG. 8. Note that, the position of Singapore is the position indicated by a dotted circle 333. Therefore, the user changes the posture of the information processing device 100 so that a center position 332 of the display area falls on the position of Singapore (dotted circle 333).

Then, if a predetermined user operation (for example, pressing of the determination button 111 shown in FIG. 11) is performed with the position of Singapore on the map (dotted circle 333) aligned with the center position 332 of the display area, correct answer sound data is output. For example, sound based on correct answer sound data stored in the additional information 206 shown in FIG. 3 is output from the sound output unit 171.

On the other hand, if a predetermined user operation (for example, pressing of the determination button 111 shown in FIG. 11) is performed with the position of Singapore on the map (dotted circle 333) not aligned with the center position 332 of the display area, incorrect answer sound data is output. For example, sound based on incorrect answer sound data stored in the additional information 206 shown in FIG. 3 is output from the sound output unit 171.

As described, the control unit 180 can display a question for displaying an object (for example, Singapore). In this case, if the object (for example, Singapore) is included in the specific position (for example, center position) in the image displayed on the projection plane 10 after displaying the question, the control unit 180 can provide a specific effect regarding the object.

Note that, although an example of a quiz for answering the position of the city on the map is shown in FIG. 8, a quiz for providing other answers may be given, for example. For example, an image of a car and the name of the car (car name) are associated with each other to be defined as a spatial position action, each defined car is randomly selected, and the car name is displayed over the image of the car. Then, the user changes the posture of the information processing device 100 to align the position of the image of the car selected from the list of cars with the center position of the display area. Also, a quiz for answering other vehicles (train, motorcycle), animal, insect, plant or the like may be given.

[Example of Display when Shooting is Set]

FIG. 9 shows an example of an image projected by the information processing device 100 according to the first embodiment of the present technology In FIG. 9, an example of an image when the shooting (omnidirectional shooting game) is set as an operation mode is shown. In addition, in FIG. 9, an example in which randomly-arranged ghost images are shown and these ghost images are shot when the shooting is set is shown.

It is assumed that all or parts of areas (for example, areas 341 and 342) of an image 340 shown in FIG. 9 are projected by the information processing device 100 and displayed on the projection plane 10.

FIGS. 10a and 10b show examples of images projected by the information processing device 100 according to the first embodiment of the present technology, a of FIG. 10 shows an example of display of an image included in the area 342 shown in FIG. 9 and b of FIG. 10 shows an example of display of an image included in the area 341 shown in FIG. 9.

FIG. 11 simplistically shows a case in which a shooting game is played with the information processing device 100 according to the first embodiment of the present technology. In FIG. 11, a ghost image not to be displayed on the projection plane 10 is indicated by a dotted line. In addition, the image 340 corresponds to the image 340 shown in FIG. 9.

For example, spatial position is randomly generated as a spatial position action and a definition for displaying a target and reproducing effect sound at that position is generated. Then, the user points various directions to find a target (ghost image) while changing the posture of the information processing device 100.

For example, an area where a ghost image exists is found in the image 340 shown in FIG. 11. For example, the area 342 shown in FIG. 11 does not include a ghost image. Then, for example, the user changes the posture of the information processing device 100 so that the projection direction faces downward. In this case, as shown in FIG. 11, since the area 341 includes a ghost image, the ghost image can be displayed on the projection plane 10. In this case, the user changes the posture of the information processing device 100 so that a center position 343 (shown in FIG. 10) of the display area is included in the ghost image. Then, when a predetermined user operation (for example, pressing of the determination button 111) is performed with the center position 343 of the display area included in the ghost image, effect sound is output as the action. For example, sound 347 based on hit sound data stored in the additional information 206 shown in FIG. 3 is output from the sound output unit 171. As described, a game in which effect sound is produced when the target is pointed (omnidirectional shooting game) can be realized. Also, an image (effect image) indicating that the target is pointed (hit) may be displayed.

As shown in FIG. 11, the user can find a ghost image while changing the projection direction of the information processing device 100.

As described, when a specific user operation is accepted while the image displayed on the projection plane 10 includes a specific object (for example, ghost image), the control unit 180 can provide a specific effect regarding the specific object. The specific effect includes, for example, output of effect sound and display of an effect image.

Note that, arrangement of ghosts may be regularly or irregularly changed.

Note that, although an example in which randomly-arranged ghost images are shown and these ghost images are shot is shown in FIGS. 9 to 11, the same can be applied to a case in which other objects are shot, for example.

[Example of Display when Drawing is Set]

FIG. 12 shows an example of shift of images 350 to 353 projected by the information processing device 100 according to the first embodiment of the present technology.

FIG. 12 shows an example of shift of images when the drawing (omnidirectional drawing) is set as an operation mode. Also, FIG. 12 shows an example of display of trace (trace of pointing of spatial position) according to change of the posture of the information processing device 100 when the drawing is set. Also, FIG. 12 shows an example in which the trace of a center position 354 of an image 350 displayed on the projection plane 10 is drawn with a line. Note that, in FIG. 12, background images are omitted to simplify the description.

For example, it is possible to draw a moon-shaped line 355 with the trace of the center position 354 of the image displayed on the projection plane 10 by changing the posture of the information processing device 100 while a predetermined user operation (for example, pressing of the determination button 111 shown in FIG. 11) is being performed.

In addition, for example, it is possible to draw a circle line 356 with the trace of the center position 354 of the image displayed on the projection plane 10 by changing the posture of the information processing device 100 while a predetermined user operation is being performed.

In addition, for example, it is possible to draw an arrow line 357 with the trace of the center position 354 of the image displayed on the projection plane 10 by changing the posture of the information processing device 100 while a predetermined user operation is being performed.

In addition, the control unit 180 stores these traces in the spatial position action memory 141 as trace information. Also, these traces are stored in association with the spatial position. Therefore, these traces are displayed when they are projected in the direction of display of the corresponding spatial position, but are not displayed when they are not projected in the direction of display of the corresponding spatial position. That is, depending on the projection direction of the information processing device 100, there is a case in which parts or all of the drawn traces are out of the display area and are not displayed.

FIG. 13 shows an example of display of an image projected by the information processing device 100 according to the first embodiment of the present technology.

FIG. 13 shows an example in which the moon-shaped line 355, the circle line 356, and the arrow line 357 drawn by changing the posture of the information processing device 100 shown in FIG. 12 are over the background image.

For example, when a dog is explained while a dog image is being displayed as a background image, each trace (moon-shaped line 355, circle line 356, and arrow line 357) is drawn by changing the posture of the information processing device 100. Then, a dog can be explained with each trace (moon-shaped line 355, circle line 356, and arrow line 357).

In addition, an object to be drawn may be changed with drawing tools 361 to 363. For example, it is possible to change the color and width of the line to be drawn and to fill a closed space.

As described, the control unit 180 can display information on the traces associated with the image displayed on the projection plane 10.

As described, according to the first embodiment of the present technology, it is possible to appropriately display a part of an image (still image, moving image) or the like obtained by capturing wide an area such as panoramic image and omnidirectional image on the basis of change of the posture of the projection unit. In this case, it is possible to realize interactive functions by spatial position (overlapping of images for each projection direction, display of information, reproduction of image and music, drawing, overlapping of traces, and the like) by pointing according to the projection direction, the position, and the image of the projection unit. Accordingly, it is possible to further expand user experience by changing the projection direction by the user, which is an intuitive operation.

2. Second Embodiment

In the second embodiment of the present technology, an example in which a desired item image is selected from several item images by changing the projection direction of the projection unit, which is an intuitive operation, will be described. Note that, the configuration of the information processing device in the second embodiment of the present technology is substantially the same as that of the information processing device 100 shown in FIG. 1, FIG. 2, and the like. Therefore, the same reference numerals are given to the elements common with the information processing device 100 and parts of description of these elements will be omitted.

[Example of Display of Spatial Image Menu]

Figure 14:
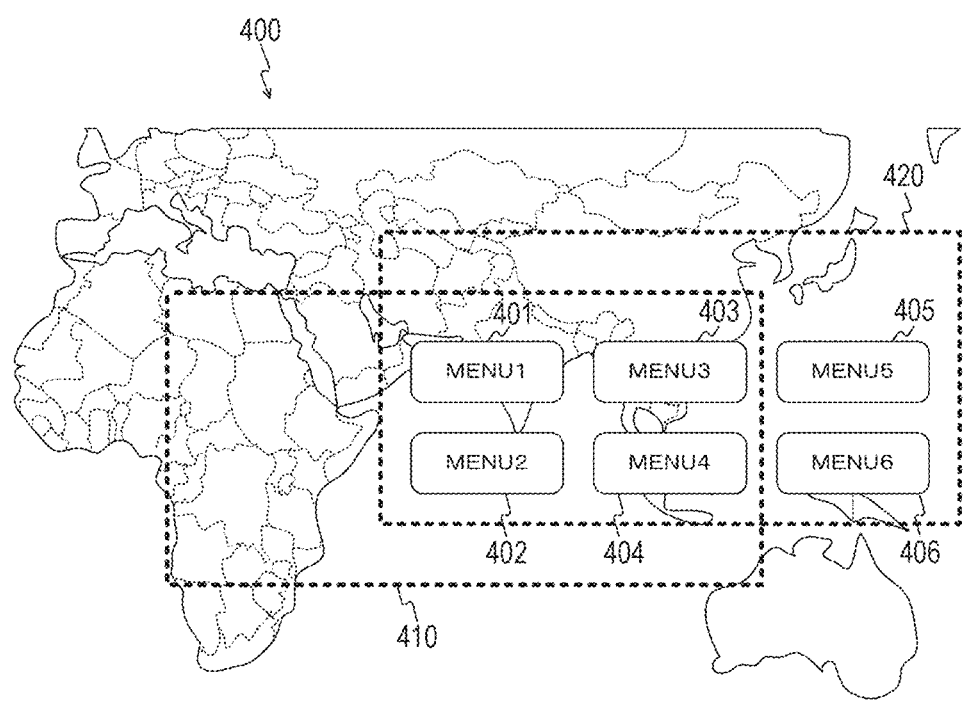
FIG. 14 shows an example of an image projected by the information processing device 100 according to the second embodiment of the present technology.

FIG. 14 shows an example of an image projected by the information processing device 100 according to the second embodiment of the present technology.

FIG. 14 shows a whole spatial image (world map 400) to be displayed and spatial image menu (menu buttons 401 to 406) to be displayed over the spatial image. That is, FIG. 14 shows an example in which several menu buttons 401 to 406 for performing predetermined operations are displayed over the world map 400.

Note that, the world map 400 is displayed on the basis of the image data stored in the image data memory 132 (shown in FIG. 2). In addition, the menu buttons 401 to 406 are displayed on the basis of each piece of information stored in the spatial position action memory 141 (shown in FIGS. 2 and 3). Also, the display range of the world map 400 and the menu buttons 401 to 406 is changed in accordance with change of the posture of the information processing device 100. For example, an example of display of an image included in an area 410 is shown in a of FIG. 15 and an example of display of an image included in an area 420 is shown in b of FIG. 15.

FIGS. 15a and 15b show an example of shift of display of a projection image displayed by the information processing device 100 according to the second embodiment of the present technology.

a of FIG. 15 shows an example of display of a spatial image included in the area 410 out of the whole spatial image shown in FIG. 14. b of FIG. 15 shows an example of display of a spatial image included in the area 420 out of the whole spatial image shown in FIG. 14.

Here, it is possible to shift from the state of display of the spatial image included in the area 410 shown in a of FIG. 15 to the state of display of the spatial image included in the area 420 shown in b of FIG. 15 by changing the posture of the information processing device 100 by the user. Similarly, it is possible to shift from the state of display of the spatial image included in the area 420 shown in b of FIG. 15 to the state of display of the spatial image included in the area 410 shown in a of FIG. 15 by changing the posture of the information processing device 100 by the user. In addition, although it is also possible to shift to the state of display of the spatial image included in other areas by changing the posture of the information processing device 100 by the user, graphical representation and description are omitted here.

For example, the menu button nearest to the center position of the display area out of the menu buttons included in the display area is turned into a selected state. For example, in an example shown in a of FIG. 15, since the menu button 402 (MENU2) is the menu button nearest to the center position of the display area, the menu button 402 (MENU2) is turned into a selected state. In addition, for example, in an example shown in b of FIG. 15, since the menu button 403 (MENU3) is the menu button nearest to the center position of the display area, the menu button 403 (MENU3) is turned into a selected state. Note that, a menu button in a selected state is displayed in a different style from other menu buttons. For example, in a and b of FIG. 15, menu buttons in a selected state are shown with slashed lines.

Here, an example of operation to shift from a state shown in a of FIG. 15 (state in which the menu button 402 (MENU2) is selected) to a state in which the menu button 403 (MENU3) is selected will be described. In this case, the user changes the posture of the information processing device 100 so that the menu button 403 (MENU3) becomes the menu button nearest to the center position of the display area. For example, the posture of the information processing device 100 is changed by changing the projection direction of the information processing device 100 to the upper-right side. Accordingly, the menu button 403 (MENU3) can be in a selected state.

In addition, for the menu button in a selected state, the selection can be fixed (decided) by a predetermined user operation (for example, pressing of the determination button 111). In addition, for example, the selection may be fixed (decided) when the same menu button is in a selected state for a certain time period. In addition, for example, the selection may be fixed (decided) when a zooming operation (operation to shorten the distance between the information processing device 100 and the projection plane 10) is performed and the menu button in a selected state is enlarged. In addition, for example, the selection can be fixed (decided) when a user's predetermined gesture (for example, pointing the menu button in a selected state by a finger) is performed for the menu button in a selected state. For example, the control unit 180 can judge each gesture by an image recognition process for an image generated by an imaging unit (not shown). Gestures can be judged by a known judgment method (for example, see Japanese Patent Application Laid-Open No. 2011-85966).

[Example of Operation of Information Processing Device]

Figure 16:
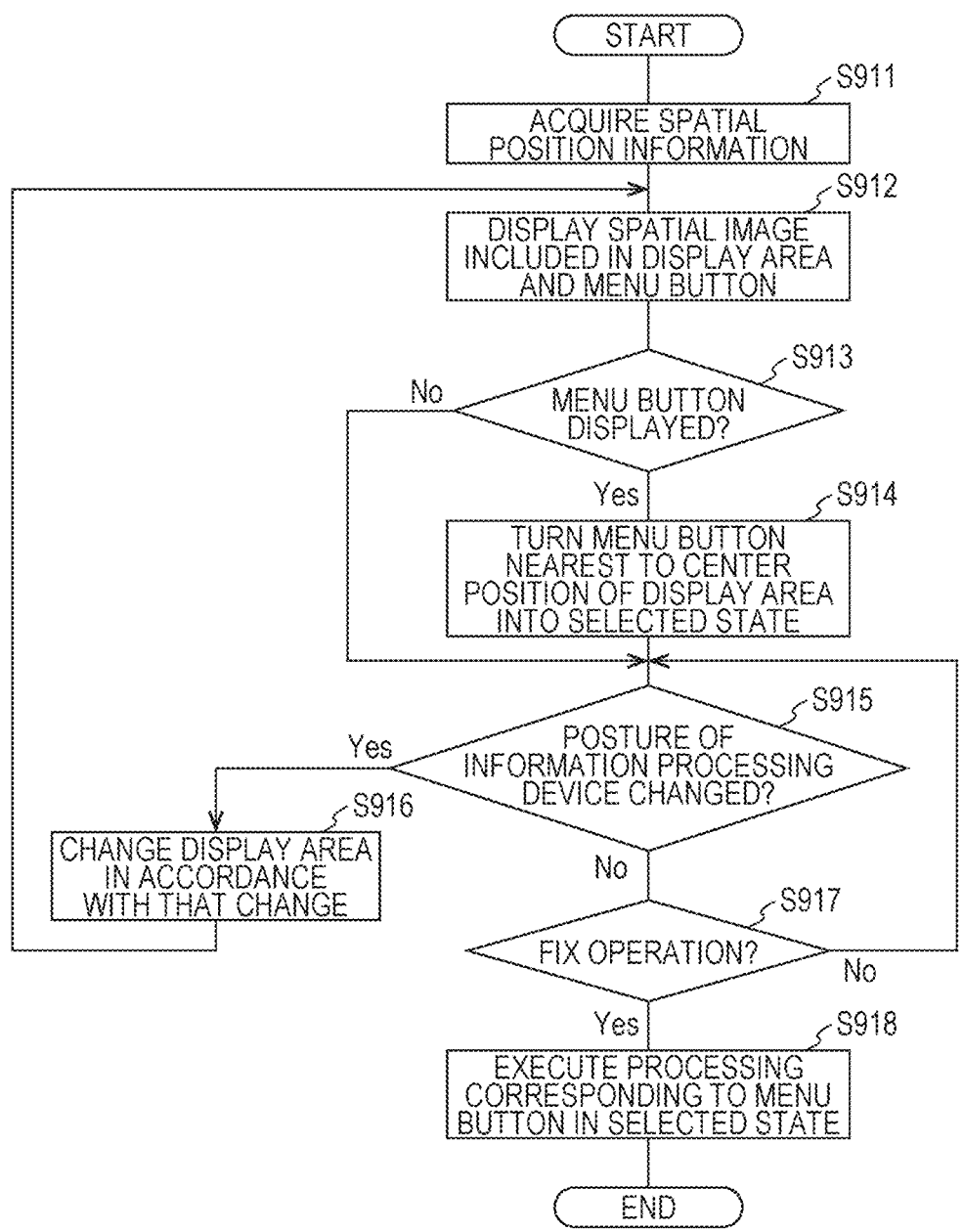
FIG. 16 is a flow chart showing an example of a menu button selection process by the information processing device 100 according to the second embodiment of the present technology.

FIG. 16 is a flow chart showing an example of a menu button selection process by the information processing device 100 according to the second embodiment of the present technology. Note that, the menu button selection process is carried out on the basis of the control of the control unit 180.

First, the spatial position action generation unit 140 acquires spatial position information from the spatial position detection unit 123 (step S911).

Subsequently, the control unit 180 displays the spatial image and the menu button included in the display area (step S912). Note that, only the spatial image is displayed when the menu button is not included in the display area.

Subsequently, the control unit 180 determines whether or not the menu button is displayed in the display area (step S913). Then, if the menu button is not displayed in the display area (step S913), the process proceeds to step S915.

In addition, if the menu button is displayed in the display area (step S913), the control unit 180 turns the menu button nearest to the center position of the display area into a selected state (step S914).

Subsequently, the control unit 180 determines whether or not the posture of the information processing device 100 has been changed (step S915). If the posture of the information processing device 100 has been changed (step S915), the control unit 180 changes the display area according to the change of the posture (step S916) and the process goes back to step S912.

If the posture of the information processing device 100 has not been changed (step S915), the control unit 180 determines whether or not an operation to fix the selected state of the menu button (fix operation) has been performed (step S917). If the fix operation has not been performed (step S917), the process goes back to step S915. On the other hand, if the fix operation has been performed (step S917), the control unit 180 performs processing corresponding to the menu button in a selected state (step S918).

Note that, although this example shows a case in which one menu button nearest to the center position of the display area is turned into a selected state, one menu button nearest to the center position of the display area and one menu button second nearest to the center position of the display area may be turned into a selected state. Similarly, three or more menu buttons may be turned into a selected state.

As described, the control unit 180 can display several item images (for example, menu buttons) on the projection plane 10 on the basis of the control information. In this case, the control unit 180 can turn a predetermined number (for example, one or two or more) of item images out of several item images into a selected state on the basis of the display position of several item images displayed on the projection plane 10.

As described, according to the second embodiment of the present technology, it is possible to easily carry out an operation to select a menu button by changing the posture of the information processing device 100. In this selection method, a menu button can be displayed with the whole area of the sphere without being limited to the range presently displayed.

That is, according to the second embodiment of the present technology, it is possible to easily select a menu by changing the direction of the information processing device 100 on the menu display, which is an intuitive operation. In this case, operation of an operation part for selection (for example, arrow key) is not necessary. In addition, a range for displaying a menu can be expanded to the range that is not presently displayed, and the range of the whole sphere can be used.

Note that, arrangement of menu buttons may be fixed to a certain predetermined spatial position as shown in FIG. 14 or may be regularly or irregularly changed without being fixed. For example, arrangement of menu buttons may be changed according to change of the posture of the information processing device 100. For example, the spatial position the information processing device 100 is projecting an image can be detected and arrangement of menu buttons can be determined with the center position being the spatial position. According to arrangement as described, it is possible to reduce burden for the user to move the information processing device 100.

In addition, although an example for displaying menu buttons has been described in the second embodiment of the present technology, the second embodiment of the present technology can be applied to a case in which something other than menu buttons is displayed. For example, it can be applied to a case in which many contents (for example, still image and moving image) are to be selected. For example, it is possible to arrange images representing contents on the sphere and to select a desired content by changing the projection direction of the information processing device 100.

3. Third Embodiment

In the third embodiment of the present technology, an example to change the display area of the projected image (for example, display magnification of image) on the basis of the distance between the information processing device and the projection plane is shown. Note that, the configuration of the information processing device in the third embodiment of the present technology is substantially the same as that of the information processing device 100 shown in FIG. 1, FIG. 2, and the like. Therefore, the same reference numerals are given to the elements common with the information processing device 100 and parts of description of these elements will be omitted.

[Example of Control of Display on the Basis of Distance Between Information Processing Device and Projection Plane]

FIGS. 17*a*, 17*b*, 18*a*, and 18*b* show a relation between the distance between the information processing device 100 according to the third embodiment of the present technology and a projection plane and an image projected on the projection plane by the information processing device 100.

Here, the size of the image projected on the projection plane changes according to the distance between the information processing device 100 and the projection plane. For example, when the distance between the information processing device 100 and the projection plane is long as shown in a of FIG. 17, the size of the image projected on the projection plane becomes large as shown in b of FIG. 17. For example, an image 500 is displayed on the projection plane.

In addition, for example, when the distance between the information processing device 100 and the projection plane is short as shown in a of FIG. 18, the size of the image projected on the projection plane becomes small as shown in b of FIG. 18. For example, an image 511 is displayed on the projection plane. Note that, in a and b of FIG. 18, the size of the image 500 shown in a and b of FIG. 17 is schematically shown by a rectangle 510 of dotted line.

As described, in the third embodiment of the present technology, an example to change the size of the image projected on the projection plane according to the distance between the information processing device 100 and the projection plane is shown. In addition, in the third embodiment of the present technology, the display area of an image to be displayed is changed according to change of the size of the image. That is, display magnification of the image projected on the projection plane is changed according to the distance between the information processing device 100 and the projection plane. Accordingly, it is possible to display the size of the object (for example, horse) included in the image displayed on the projection plane with the same size even if the distance between the information processing device 100 and the projection plane is changed.

Here, for example, in the case of an image content (for example, still image content and moving image content) captured by an image capture device and recorded, there is a case in which additional information when capturing the image is recorded in association with the image content. Note that, additional information when capturing an image is, for example, spatial position data stored in the spatial position data memory 133.

For example, when an image content (for example, still image content or moving image content) captured by an image capture device and recorded is to be projected on the projection plane, it is possible to project the image content in the real scale on the basis of the additional information.

For example, if the distance between the information processing device 100 and the projection plane is short as shown in a of FIG. 18, a partial image is displayed with respect to the real-scale virtual image space.

Also, for example, when the distance between the information processing device 100 and the projection plane becomes long as shown in b of FIG. 17, the projection plane gets closer to the real-scale virtual image space.

Also, for example, it is also possible to project a real-scale virtual image space on a part of the projection plane by making the distance larger than the distance shown in b of FIG. 17 (distance between the information processing device 100 and the projection plane).

Here, the distance between the information processing device 100 and the projection plane can be measured by various distance sensors (for example, distance sensor using ultrasonic wave, infrared ray, laser, or the like).

Also, it is possible to measure the distance between the information processing device 100 and the projection plane with an image generated by capturing the image projected on the projection plane by an image capture device that can be included in the information processing device 100. This example of measurement is shown in FIGS. 19*a* and 19*b*.
[Example of Measurement of Distance Between Information Processing Device and Projection Plane]

FIGS. 19*a* and 19*b* simplistically show the information processing device 100 according to the first embodiment of the present technology and the projection plane 10 seen from above.

In FIGS. 19*a* and 19*b*, it is assumed that an imaging unit 124 is provided in the information processing device 100 at the position away from the projection unit 172 by the distance D.

For example, if the information processing device 100 and the projection plane 10 are away from each other by the distance L1 as shown in a of FIG. 19, an image emitted from the center position of the projection unit 172 is seen in the direction away from the optical axis of the imaging unit 124 by the angle A1. This relationship can be represented by the following formula.

$$\tan A1 = D/L1$$

L1 (=D/tan A1) can be obtained by this formula.

In addition, the information processing device 100 and the projection plane 10 are away from each other by the distance L2 as shown in b of FIG. 19, an image emitted from the center of the projection unit 172 is seen in the direction away from the optical axis of the imaging unit 124 by the angle A2. This relationship can be represented by the following formula.

$$\tan A2 = D/L2$$

L2 (=D/tan A2) can be obtained by this formula.

Here, the distance D between the projection unit 172 and the imaging unit 124 in the information processing device 100 is constant. In addition, the angles A1 and A2 seen from the imaging unit 124 can be obtained by the pixel position of the image captured by the imaging unit 124. For example, the angles A1 and A2 can be obtained on the basis of the number of pixels from a marking when a marking (for example, rectangle) is displayed on the specific position (for example, center position) of the display area. Then, the distances L1 and L2 between the information processing device 100 and the projection plane 10 can be obtained with the distance D and the angles A1 and A2.

Then, the control unit 180 determines display magnification using the distances L1 and L2 between the information processing device 100 and the projection plane 10 so that the size (display size) of the object (for example, horse) included in the image projected on the projection plane becomes the same. For example, the control unit 180 determines the display area for projecting a cut-out image on the basis of the information when capturing the image (spatial position data) and the distance to the projection plane when projecting the image. Note that, the image or music may be changed on the basis of the distance to the projection plane when projecting the image.

In addition, trapezoid distortion correction may be carried out using the distance between the information processing device 100 and the projection plane 10. For example, it is possible to detect the distance of four corners of the projected image (distance between the information processing device 100 and the projection plane 10) to carry out trapezoid distortion correction on the basis of this distance.
[Example of Operation of Information Processing Device]

Figure 20:
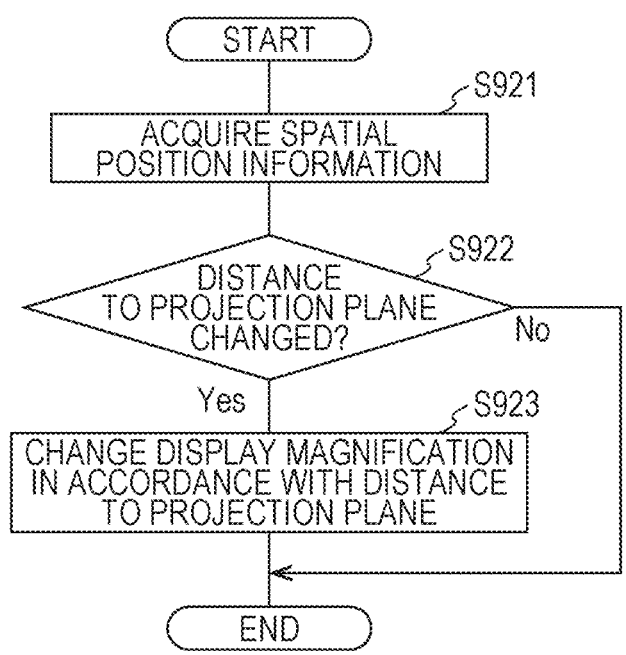
FIG. 20 is a flow chart showing an example of an image display process by the information processing device 100 according to the third embodiment of the present technology.

FIG. 20 is a flow chart showing an example of an image display process by the information processing device 100 according to the third embodiment of the present technology. Note that, this image display process is carried out on the basis of the control of the control unit 180.

First, the spatial position action generation unit 140 acquires spatial position information from the spatial position detection unit 123 (step S921).

Subsequently, the control unit 180 determines whether or not the distance between the information processing device 100 and the projection plane has been changed (step S922). If the distance between the information processing device 100 and the projection plane has been changed (step S922), the control unit 180 changes the display magnification according to the change of the distance (step S923). That is, the control unit 180 determines the display magnification on the basis of that distance (step S923). If the distance between the information processing device 100 and the projection plane has not been changed (step S922), the operation of the image display process is terminated.

As described, the control unit 180 can change the display area of the image displayed on the projection plane 10 on the basis of the distance between the information processing device 100 and the projection plane.

In addition, the control unit 180 can display an image associated with at least one piece of information of the orientation, the posture, and the position information of the image capture device when capturing the image to change the display area of the image displayed on the projection plane 10 on the basis of that information.

As described, according to the third embodiment of the present technology, it is possible to make the size of the object included in the projected image the same even if the size of the image is changed with the change of the distance between the information processing device 100 and the projection plane. Accordingly, it is possible for the user to easily see a projection image.

In addition, for example, the direction the user wants to see can be displayed without being influenced by the distance of the image capture device when capturing the image when displaying an omnidirectional image or the like by using the spatial position data stored in the spatial position data memory 133. For example, a case in which the image capture device becomes upside-down during an image capturing operation is assumed. When the image recorded by the image capturing operation is to be displayed, the projected image can be displayed upside-down by using the spatial position data of the time zone in which the image capture device is upside-down. Accordingly, it is possible to eliminate an influence of the direction of the image capture device when capturing the image.

Note that, in the embodiments of the present technology, a device including all functions (information processing device 100) has been described as an example. However, the embodiments of the present technology can also be applied to an information processing system realizing each part included in these information processing devices by several devices. For example, the spatial position action generation unit 140, the spatial image/spatial sound image generation unit 130, and the like can be provided on an information processing system (for example, cloud computing) existing on the network.

In addition, although an example for projecting an image by one information processing device has been described in the embodiments of the present technology, the embodiments of the present technology may be applied to a case in which an image is projected by several information processing devices. However, when an image is projected by several information processing devices, it is necessary to share data (for example, data in each memory) and to adjust the spatial position.

When data is to be shared, for example, each data in the sound data memory 131, the image data memory 132, and the spatial position data memory 133 shown in FIG. 2 and data in the spatial position action memory 141 need to be shared in all devices. In this case, as a method for sharing data, for example, a method in which an information processing device holding data functions as a server and other information processing devices are connected to the server to download the data can be used.

In addition, when the spatial position is to be adjusted, the reference of the spatial position generated by the spatial position detection unit 123 shown in FIG. 2 needs to be adjusted among the several information processing devices. Then, for example, a sensor for detecting the position and the posture with magnet can be used. For example, it is possible to adjust the reference of the spatial position among the several information processing devices by providing the sensor in each information processing device and acquiring the position and the posture of all information processing devices with the reference being the magnetic field generator.

In addition, for example, AR (Augmented Reality) technique may be used. For example, it is possible to acquire the posture of each information processing device with the reference being an AR marker by capturing the AR marker by the imaging unit included in each information processing device.

In addition, for example, it is possible to adjust the reference of the spatial position in all information processing devices by capturing the image projected by one information processing device by another information processing device and matching the image in another information processing device.

As described, it is possible to project and display an image in the same space by several information processing devices by sharing the data and adjusting the spatial position by all information processing devices. For example, the shooting game shown in FIGS. 9 to 11 can be enjoyed by several people at the same time.

Note that, the embodiments described above show examples for realizing the present technology and items in the embodiments correspond to items for specifying the invention in the claims. Similarly, items for specifying the invention in the claims correspond to items in the embodiments of the present technology with the same titles. However, the present technology is not limited to the embodiments and can be realized with various modifications to the embodiments without departing from the spirit of the present technology.

In addition, the processes described in the above embodiments may be interpreted as a method including a series of these processes or as a program causing a computer to execute a series of these processes or a recording medium storing such a program. CD (Compact Disc), MD (Mini Disc), DVD (Digital Versatile Disc), memory card, Blu-ray disc (Blu-ray (registered trademark) Disc), and the like can be used as a recording medium, for example.

Note that, effects described in this specification are merely examples. Effects of the present technology are not limited to those described in this specification and other effects may be provided.

Note that, the configuration of the present technology may be ones described below.

(1)

An information processing device including a control unit for controlling an image displayed on a projection plane on the basis of a display area of the image displayed on the projection plane specified on the basis of a relative positional relationship between a projection unit for projecting and displaying a part of an image to be displayed on the projection plane and the projection plane and control information associated with the image to be displayed.

(2)

The information processing device described in (1), wherein the control unit displays several item images on the projection plane on the basis of the control information and turns the predetermined number of item images out of the several item images into a selected state on the basis of a display position of the several item images displayed on the projection plane.

(3)

The information processing device described in (2), wherein the control unit displays a background image as the image to be displayed and displays the several item images on the background image on the basis of the control information.

(4)

The information processing device described in any of (1) to (3), further including a posture detection unit for detecting a posture of the projection unit, wherein
the control unit changes a display area of the image displayed on the projection plane on the basis of the detected posture of the projection unit.

(5)

The information processing device described in (4), wherein the control unit controls a mode of display of the image displayed on the projection plane on the basis of the display area of the image after the change and the control information associated with the image.

(6)

The information processing device described in (4) or (5), wherein the control unit outputs sound regarding the image displayed on the projection plane on the basis of the display area of the image after the change and the control information associated with the image.

(7)

The information processing device described in any of (1) to (6), wherein
the control information includes information on an object included in the image to be displayed, and
the control unit displays information on the object included in the image displayed on the projection plane.

(8)

The information processing device described in (7), wherein the control unit displays assist information for displaying the image including the object when the image displayed on the projection plane does not include the object.

(9)

The information processing device described in (7), wherein the control unit displays a question for displaying the object, and produces a specific effect regarding the object when the object is included in the image displayed on the projection plane after the display of the question.

(10)

The information processing device described in any of (1) to (6), wherein the control unit produces a specific effect regarding a specific object when a specific user operation is accepted while the specific object is included in the image displayed on the projection plane.

(11)
The information processing device according to any one of (1) to (10), wherein
the control information includes track information in which a track of change of the detected posture of the projection unit is associated with the image to be displayed, and
the control unit displays information on the track associated with the image displayed on the projection plane.

(12)
The information processing device described in any of (1) to (11), wherein
the control unit further includes a distance detection unit for detecting a distance between the information processing device and the projection plane, and
the control unit changes a display area of the image displayed on the projection plane on the basis of the detected distance.

(13)
The information processing device described in any of (1) to (12), wherein the control unit displays an image associated with at least one piece of information of an orientation, a posture, and position information of an image capture device when capturing the image as the image to be displayed and changes a display area of the image displayed on the projection plane on the basis of that information.

(14)
An information processing method including a control process for controlling an image displayed on a projection plane on the basis of a display area of the image displayed on the projection plane specified on the basis of a relative positional relationship between a projection unit for projecting and displaying a part of an image to be displayed on the projection plane and the projection plane and control information associated with the image to be displayed.

(15)
A program for causing a computer to execute a control process for controlling an image displayed on a projection plane on the basis of a display area of the image displayed on the projection plane specified on the basis of a relative positional relationship between a projection unit for projecting and displaying a part of an image to be displayed on the projection plane and the projection plane and control information associated with the image to be displayed.

REFERENCE SIGNS LIST

100 Information processing device
110 Operation acceptance unit
111 Determination button
120 Spatial position information generation unit
121 Posture detection unit
122 Distance detection unit
123 Spatial position detection unit
124 Imaging unit
130 Spatial image/spatial sound image generation unit
131 Sound data memory
132 Image data memory
133 Spatial position data memory
134 Spatial sound image generation unit
135 Spatial image generation unit
140 Spatial position action generation unit
141 Spatial position action memory
142 Spatial sound image generation unit
143 Spatial image generation unit
150 Image/sound image synthesis unit
151 Sound image synthesis unit
152 Image synthesis unit
160 Image/sound generation unit
161 Sound generation unit
162 Image generation unit
170 Output unit
171 Sound output unit
172 Projection unit
180 Control unit

The invention claimed is:

1. An information processing device, comprising:
a projector; and
circuitry configured to:
control a first image displayed on a projection plane, wherein the first image is controlled based on a display area of the first image displayed on the projection plane and control information associated with the first image;
detect, by at least one sensor, a relative positional relationship between the projector of the information processing device and the projection plane, wherein
the display area of the first image displayed on the projection plane is specified based on the relative positional relationship between the projector and the projection plane, and
the relative positional relationship includes a first distance between the projector of the information processing device and the projection plane;
control the projector to display at least a part of the first image;
control the projector to further display assist information when a specific object is absent in the first image that is displayed in a first direction, wherein
the displayed assist information indicates a second direction of display of a second image that includes the specific object, and a second distance from a position of the displayed assist information to a position of the specific object that is absent in the first image;
detect a change in the first distance between the projector and the projection plane; and
change the display area of the first image based on the detected change in the first distance between the projector and the projection plane.

2. The information processing device according to claim 1, wherein the circuitry is further configured to:
detect a posture of the projector, and
change the display area of the first image displayed on the projection plane based on the detected posture of the projector.

3. The information processing device according to claim 2, wherein the circuitry is further configured to control a mode of display of the first image displayed on the projection plane based on the changed display area of the first image and the control information associated with the first image.

4. The information processing device according to claim 2, wherein the circuitry is further configured to output sound associated with the first image displayed on the projection plane, based on the changed display area of the first image and the control information associated with the first image.

5. The information processing device according to claim 2, wherein
the control information includes track information in which a track of change of the detected posture of the projector is associated with the first image, and the circuitry is further configured to display information on the track associated with the first image displayed on the projection plane.

6. The information processing device according to claim 1, wherein the circuitry is further configured to display the information of an object included in the first image displayed on the projection plane.

7. The information processing device according to claim 6, wherein the circuitry is further configured to:
control the projector to display a question for display of the object; and
produce a specific effect associated with the object when the object is included in the first image displayed on the projection plane after the display of the question.

8. The information processing device according to claim 1, wherein the circuitry is further configured to produce a specific effect associated with a specific object based on acceptance of a specific user operation at a time the specific object is included in the first image displayed on the projection plane.

9. The information processing device according to claim 1, wherein the circuitry is further configured to:
display a second image associated with at least one piece of information of an orientation, a posture, or position information of an image capture device, based on capture of the second image as the first image; and
change the display area of the first image displayed on the projection plane based on the at least one piece of information.

10. The information processing device according to claim 1, wherein the circuitry is further configured to:
control the projector to display at least the part of the first image as a background image; and
control the projector to display a plurality of item images on the background image based on the control information, wherein
the control information further includes spatial position information corresponding to each of the plurality of the item images associated with the first image; and
select at least one item image of the plurality of item images based on the spatial position information.

11. An information processing method, comprising:
controlling a first image displayed on a projection plane, wherein the first image is controlled based on a display area of the first image displayed on the projection plane and control information associated with the first image;
detecting a relative positional relationship between a projector of an information processing device and the projection plane, using at least one sensor, wherein
the display area of the first image displayed on the projection plane is specified based on the relative positional relationship between the projector and the projection plane, and
the relative positional relationship includes a distance between the projector of the information processing device and the projection plane;
controlling the projector to display at least a part of the first image;
controlling the projector to further display assist information when a specific object is absent in the first image that is displayed in a first direction, wherein
the displayed assist information indicates a second direction of display of a second image that includes the specific object, and a second distance from a position of the displayed assist information to a position of the specific object that is absent in the first image;
detecting a change in the distance between the projector and the projection plane; and
changing the display area of the first image based on the detected change in the distance between the projector and the projection plane.

12. A non-transitory computer-readable medium having stored thereon computer-executable instructions that, when executed by a computer, cause the computer to execute operations, the operations comprising:
controlling a first image displayed on a projection plane, wherein the first image is controlled based on a display area of the first image displayed on the projection plane and control information associated with the first image;
detecting a relative positional relationship between a projector of an information processing device and the projection plane, using at least one sensor, wherein
the display area of the first image displayed on the projection plane is specified based on the relative positional relationship between the projector and the projection plane, and
the relative positional relationship includes a distance between the projector of the information processing device and the projection plane;
controlling the projector to display at least a part of the first image;
controlling the projector to further display assist information when a specific object is absent in the first image that is displayed in a first direction, wherein
the displayed assist information indicates a second direction of display of a second image that includes the specific object, and a second distance from a position of the displayed assist information to a position of the specific object that is absent in the first image;
detecting a change in the distance between the projector and the projection plane; and
changing the display area of the first image based on the detected change in the distance between the projector and the projection plane.

* * * * *